(12) United States Patent
Saito et al.

(10) Patent No.: US 7,289,982 B2
(45) Date of Patent: Oct. 30, 2007

(54) SYSTEM AND METHOD FOR CLASSIFYING AND SEARCHING EXISTING DOCUMENT INFORMATION TO IDENTIFY RELATED INFORMATION

(75) Inventors: Mari Saito, Kanagawa (JP); Noriyuki Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 417 days.

(21) Appl. No.: 10/316,762

(22) Filed: Dec. 12, 2002

(65) Prior Publication Data

US 2003/0140309 A1 Jul. 24, 2003

(30) Foreign Application Priority Data

Dec. 13, 2001 (JP) .............................. 2001-379511
May 22, 2002 (JP) .............................. 2002-147225

(51) Int. Cl.
G06F 7/00 (2006.01)
G06F 17/30 (2006.01)
G06F 3/00 (2006.01)

(52) U.S. Cl. ................... 707/3; 707/2; 707/5; 707/100; 707/102; 707/104.1; 715/700

(58) Field of Classification Search .................... 707/3; 715/700

See application file for complete search history.

(56) References Cited

U.S. PATENT DOCUMENTS

| | | | | |
|---|---|---|---|---|
| 5,146,405 A | * | 9/1992 | Church ........................ | 704/9 |
| 5,442,778 A | * | 8/1995 | Pedersen et al. ............... | 707/5 |
| 5,576,954 A | * | 11/1996 | Driscoll ......................... | 707/3 |
| 5,657,462 A | * | 8/1997 | Brouwer et al. ............ | 715/709 |
| 5,715,468 A | * | 2/1998 | Budzinski ....................... | 704/9 |
| 5,787,421 A | * | 7/1998 | Nomiyama .................... | 707/5 |
| 5,893,114 A | * | 4/1999 | Hashimoto et al. ........ | 707/200 |
| 6,006,225 A | * | 12/1999 | Bowman et al. ............... | 707/5 |

(Continued)

FOREIGN PATENT DOCUMENTS

JP          11-045280         2/1999

(Continued)

OTHER PUBLICATIONS

Salton, G., "Automatic Text Processing: The Transformation, Analysis, and Retrieval of Information by Computer," Addison-Wesley, 1989 (pp. ix-xiii, pp. 275-311, and pp. 345-348).

*Primary Examiner*—Apu Mofiz
*Assistant Examiner*—Charles E. Lu
(74) *Attorney, Agent, or Firm*—Finnegan, Henderson, Farabow, Garrett & Dunner, L.L.P.

(57) ABSTRACT

An information processing apparatus for processing related information about existing document information and specific document information is provided. The apparatus includes: an acquiring element for acquiring the related information corresponding to the existing document information. The acquiring is based on firstly, a first characteristic word extracted by an extracting element, and secondly a first weight modified by a weight modifying element. The apparatus further includes: a display controlling element for controlling display of the related information corresponding to the existing document information searched for by a searching element; and an attribute information extracting element for extracting attribute information from the existing document information and the specific document information; wherein the weight modifying element modifies the first weight based on the attribute information extracted byte attribute information extracting element.

61 Claims, 37 Drawing Sheets

U.S. PATENT DOCUMENTS

| | | | |
|---|---|---|---|
| 6,182,091 B1* | 1/2001 | Pitkow et al. | 715/501.1 |
| 6,571,240 B1* | 5/2003 | Ho et al. | 707/5 |
| 6,754,654 B1* | 6/2004 | Kim et al. | 707/4 |
| 6,845,374 B1* | 1/2005 | Oliver et al. | 707/5 |
| 6,862,566 B2* | 3/2005 | Wakita et al. | 704/2 |
| 2002/0016786 A1* | 2/2002 | Pitkow et al. | 707/3 |
| 2002/0042793 A1* | 4/2002 | Choi | 707/6 |
| 2002/0073079 A1* | 6/2002 | Terheggen | 707/3 |
| 2002/0188599 A1* | 12/2002 | McGreevy | 707/3 |
| 2003/0110162 A1* | 6/2003 | Newman | 707/3 |

FOREIGN PATENT DOCUMENTS

| | | |
|---|---|---|
| JP | 2001-155020 | 6/2001 |
| JP | 2001-312515 | 11/2001 |

* cited by examiner

FIG. 9

F I G. 17
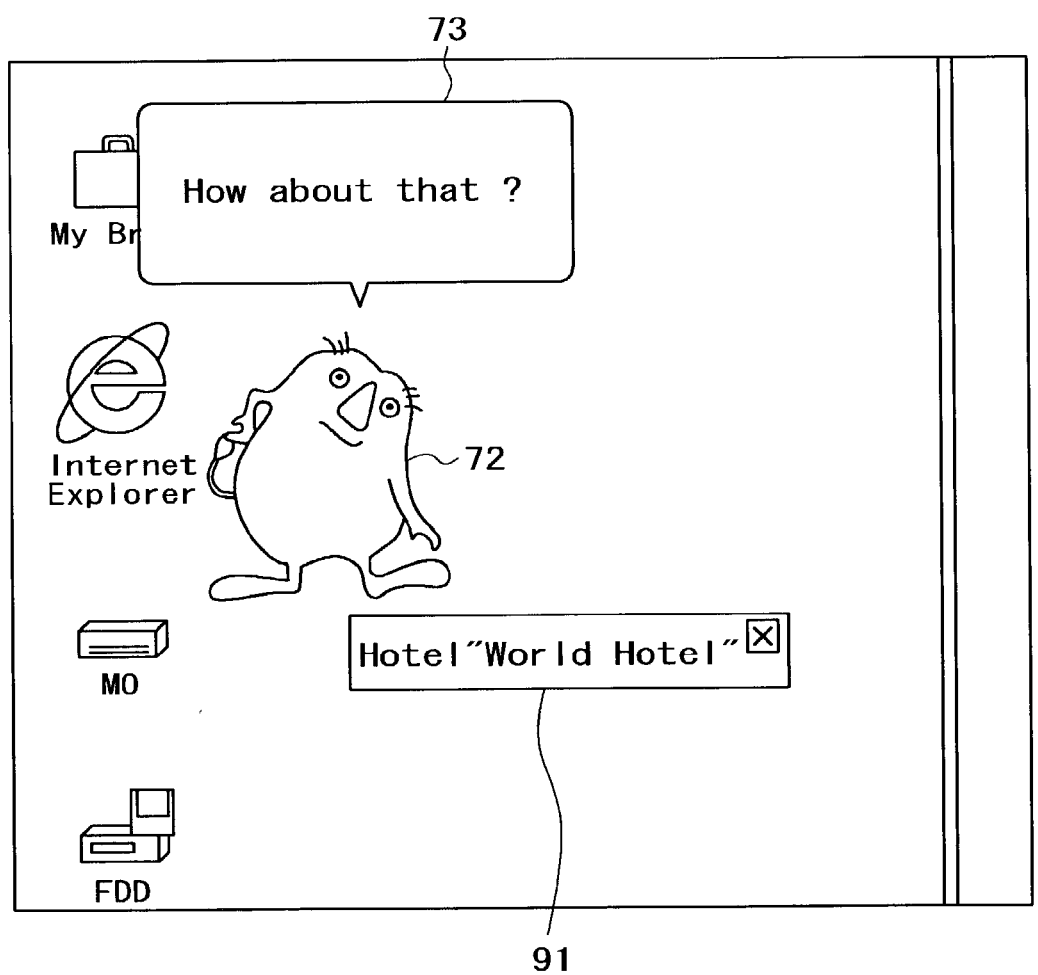

FIG. 29

☐ Any mail group in which [▶] URLs have been viewed is judged to be in need of updating.

☐ Any mail group in which the recommended URLs have been exhausted is judged to be in need of updating.

☐ Any mail group whose most recent update was [▶] days ago is judged to be in need of updating.

☐ Any mail group whose keywords have been changed based on the analysis of a newly received mail is judged to be in need of updating.

FIG. 30

| WORD → | a | b | c | d | e | f | g |
|---|---|---|---|---|---|---|---|
| CHARACTERISTIC VECTOR OF TOPIC A | ( 0, | 0.54, | 0.02, | 0, | 0, | 0.01, | 0) |
| CHARACTERISTIC VECTOR OF TOPIC B | (0.01, | 0, | 0.41, | 0.33, | 0.16, | 0, | 0.64) |
| CHARACTERISTIC VECTOR OF TOPIC C | (0.51, | 0.35, | 0, | 0, | 0.48, | 0.37, | 0) |

| ORDER | FREQUENCY (MAIL COUNT) | DESTINATION |
|---|---|---|
| 1 | 35 | Mr./Ms. A |
| 2 | 28 | Mr./Ms. B |
| 3 | 4 | Mr./Ms. C |
| 4 | 2 | Mr./Ms. D |

FIG. 33A

| WORD → | a | b | c | d | e | f | g |
|---|---|---|---|---|---|---|---|
| CHARACTERISTIC VECTOR OF TOPIC A | ( 0, | 0.65, | 0.02, | 0, | 0, | 0.01, | 0 ) |
| CHARACTERISTIC VECTOR OF TOPIC B | (0.01, | 0, | 0.41, | 0.33, | 0.16, | 0, | 0.64) |
| CHARACTERISTIC VECTOR OF TOPIC C | (0.51, | 0.35, | 0, | 0, | 0.48, | 0.37, | 0) |

FIG. 33B

| WORD → | a | b | c | d | e | f | g |
|---|---|---|---|---|---|---|---|
| CHARACTERISTIC VECTOR OF TOPIC A | ( 0, | 0.65, | 0.02, | 0, | 0, | 0.01, | 0 ) |
| CHARACTERISTIC VECTOR OF TOPIC B | (0.01, | 0, | 0.49, | 0.33, | 0.16, | 0, | 0.64) |
| CHARACTERISTIC VECTOR OF TOPIC C | (0.51, | 0.42, | 0, | 0, | 0.48, | 0.44, | 0) |

FIG. 33C

| WORD → | a | b | c | d | e | f | g |
|---|---|---|---|---|---|---|---|
| CHARACTERISTIC VECTOR OF TOPIC A | ( 0, | 0.54, | 0.02, | 0, | 0, | 0.01, | 0 ) |
| CHARACTERISTIC VECTOR OF TOPIC B | (0.02, | 0, | 0.62, | 0.50, | 0.24, | 0, | 0.96) |
| CHARACTERISTIC VECTOR OF TOPIC C | (0.61, | 0.42, | 0, | 0, | 0.58, | 0.44, | 0) |

FIG. 35

| WORD → | a | b | c | d | e | f | g |
|---|---|---|---|---|---|---|---|
| CHARACTERISTIC VECTOR OF TOPIC A | ( 0, | 0.81, | 0.03, | 0, | 0, | 0.02, | 0) |
| CHARACTERISTIC VECTOR OF TOPIC B | (0.01, | 0, | 0.49, | 0.33, | 0.24, | 0, | 0.96) |
| CHARACTERISTIC VECTOR OF TOPIC C | (0.51, | 0.53, | 0, | 0, | 0.48, | 0.56, | 0) |

F I G. 37

| WORD → | a | b | c | d | e | f | g |
|---|---|---|---|---|---|---|---|
| CHARACTERISTIC VECTOR OF TOPIC A | (0, | 0.81, | 0.02, | 0, | 0, | 0.02, | 0) |
| CHARACTERISTIC VECTOR OF TOPIC B | (0.01, | 0, | 0.41, | 0.33, | 0.16, | 0, | 0.64) |
| CHARACTERISTIC VECTOR OF TOPIC C | (0.51, | 0.53, | 0, | 0, | 0.48, | 0.56, | 0) |

FIG. 41

Mr./Ms. X
TopicX01 → Keywords A, B
TopicX02 → Keywords C, D
TopicX03 → Keywords E, G
TopicX04 → Keywords A, H Mr./Ms. Y
TopicY01 → Keywords C, F
TopicY02 → Keywords E, F
TopicY03 → Keywords A, B Gp1 : (A, B)
Gp2 : (C, D, E, F)

Where the frequencies of keywords A, B, C, D, E, and F are generally high compared with other words

FIG. 42A

On August 21, 2001, you talked to Mr./Ms. A about the party, didn't you ? I have some information about the wines and cakes you brought up during the talk.

FIG. 42B

On August 21, 2001, you talked to Mr./Ms. A about the party, didn't you ? I have some information about the wines and cakes you brought up during the talk.

FIG. 42C

On August 21, 2001, you sent an e-mail to Mr./Ms. A, didn't you ? I have some information about what you talked about.

FIG. 42D

You talked to Mr./Ms. A about the party, didn't you ? I have some information about that.

FIG. 42E

You talked to Mr./Ms. A about wines and cakes, didn't you ? I have some related information.

SYSTEM AND METHOD FOR CLASSIFYING AND SEARCHING EXISTING DOCUMENT INFORMATION TO IDENTIFY RELATED INFORMATION

BACKGROUND OF THE INVENTION

The present invention relates to an information processing apparatus, an information processing method, a storage medium, and a program. More particularly, the invention relates to an information processing apparatus, an information processing method, a storage medium, and a program for acquiring, illustratively from e-mail content, words and related information likely to attract a user's attention before storing the acquired information into a database and retrieving the suitable information therefrom for effective presentation to the user.

There exists application programs that display a so-called desktop mascot on the desktop (i.e., display screen) of a personal computer.

The desktop mascot is designed to have capabilities such as those of informing the user of the arrival of e-mails and of moving on its own across the desktop.

While the user is entering a document of an e-mail to be sent out or reading a received e-mail, it is convenient if the user is presented by the desktop mascot with information related to the document being handled (the information is called the related information hereunder). The user is likely to become attached all the more to the desktop mascot if it offers such convenient features.

Illustratively, Japanese Patent Laid-open No. 2001-312515 proposes a method for automatically creating a database using processed text files such as e-mails in order to present users with information related to documents having been sent out or received.

One disadvantage of the proposed method above is that it merely extracts related information from the database based on the target document. There are no arrangements by which to reflect degrees of the user's interest in the related information selected for presentation.

SUMMARY OF THE INVENTION

The present invention has been made in view of the above circumstances and provides an apparatus, a method and a program for presenting the user with information which is related to documents being handled by the user and which reflects the user's degree of interest.

In carrying out the invention and according to a first aspect thereof, there is provided an information processing apparatus for presenting related information about existing document information and about specific document information, the information processing apparatus including: an extracting element for extracting a first characteristic word from the existing document information and a second characteristic word from the specific document information; a weight calculating element for calculating a first weight of the first characteristic word and a second weight of the second characteristic word following the extraction by the extracting element; a weight modifying element for modifying the first weight based on a specific condition following the calculation by the weight calculating element; an acquiring element for acquiring the related information corresponding to the existing document information, based on the first characteristic word extracted by the extracting element and based on the first weight modified by the weight modifying element; a searching element for searching for the existing document information related to the specific document information, based on the second characteristic word; and a display controlling element for controlling display of the related information corresponding to the existing document information searched for by the searching element.

The acquiring element may preferably select, from a plurality of the first characteristic words in the existing document information, keywords based on the first weight in order to acquire the related information about the keywords.

The searching element may preferably calculate a similarity based on the first and the second weights in order to search for the existing document information corresponding to the specific document information based on the similarity.

The information processing apparatus of the invention may preferably include an attribute information extracting element for extracting attribute information from the existing document information and the specific document information.

The information processing apparatus of the invention may further include preferably a grouping element for arranging either one or a plurality of pieces of the existing document information into document information groups based on the attribute information extracted by the attribute information extracting element; wherein the extracting element may extract the first characteristic word from the document information groups; wherein the weight calculating element may calculate the first weight of the first characteristic word; wherein the acquiring element may acquire the related information corresponding to the document information groups based on the first characteristic word and the first weight; and wherein the searching element may search for any of the document information groups which corresponds to the specific document information, based on second characteristic word.

The weight modifying element may preferably modify the first weight based on the attribute information extracted by the attribute information extracting element.

The weight modifying element may preferably modify the first weight in accordance with a frequency either of transmissions to a specific destination or of receptions from the specific destination.

The weight modifying element may preferably modify the first weight of the first characteristic word extracted from the existing document information created by a user of the information processing apparatus.

The weight modifying element may preferably modify, in the same manner as the first weight, the weight of the same characteristic word as the first characteristic word extracted from the existing document information.

The weight modifying element may preferably modify the first weight based on a type of the first characteristic word.

The information processing apparatus of the invention may preferably include a database creating element for creating a database using the related information acquired by the acquiring element in relation to the first characteristic word in the existing document information; wherein the searching element may search the database created by the database creating element for the existing document information related to the specific document information, based on the second characteristic word.

The information processing apparatus of the invention may further include preferably a detecting element for detecting a specific event; wherein the specific document information may correspond to the detection of the specific event by the detecting element.

The existing document information and the specific document information may preferably be made up of e-mails.

The information processing apparatus of the invention may preferably include a category dictionary creating element for creating a category dictionary which is made up of groups of words in a specific data structure and which constitutes a database denoting relations between the words; wherein the weight modifying element may modify the first weight calculated by the weight calculating element, based on the category dictionary created by the category dictionary creating element.

The category dictionary may preferably constitute a database which has the word groups recorded in categories to which the words belong.

The category dictionary may preferably constitute a database which has the word groups recorded in a hierarchical structure based on the relations between the words.

The category dictionary may preferably constitute a database which has the word groups arranged in a list based on a degree of importance assigned to each of the words.

The category dictionary may preferably include the word groups and a data structure formed by those word groups which are derived from an existing dictionary database.

The category dictionary may preferably include the word groups and a data structure formed by those word groups which are derived from specific Web page data.

The category dictionary may preferably include the word groups and a data structure formed by those word groups which are derived from a list of the second characteristic words used earlier by the searching element.

The weight modifying element may preferably modify the first weight of the first characteristic word corresponding to some of the words included in the category dictionary.

According to a second aspect of the invention, there is provided an information processing method for use with an information processing apparatus for presenting related information about existing document information and about specific document information, the information processing method including the steps of: extracting a first characteristic word from the existing document information and a second characteristic word from the specific document information; calculating a first weight of the first characteristic word and a second weight of the second characteristic word following the extraction in the extracting step; modifying the first weight based on a specific condition following the calculation in the weight calculating step; controlling acquisition of the related information corresponding to the existing document information, based on the first characteristic word extracted in the extracting step and based on the first weight modified in the weight modifying step; searching for the existing document information related to the specific document information, based on the second characteristic word; and controlling display of the related information corresponding to the existing document information searched for in the searching step.

According to a third aspect of the invention, there is provided a storage medium which stores a computer-readable program for controlling an information processing apparatus for presenting related information about existing document information and about specific document information, the program including the steps of: extracting a first characteristic word from the existing document information and a second characteristic word from the specific document information; calculating a first weight of the first characteristic word and a second weight of the second characteristic word following the extraction in the extracting step; modifying the first weight based on a specific condition following the calculation in the weight calculating step; controlling acquisition of the related information corresponding to the existing document information, based on the first characteristic word extracted in the extracting step and based on the first weight modified in the weight modifying step; searching for the existing document information related to the specific document information, based on the second characteristic word; and controlling display of the related information corresponding to the existing document information searched for in the searching step.

According to a fourth aspect of the invention, there is provided a program for use with a computer which controls an information processing apparatus for presenting related information about existing document information and about specific document information, the program causing the computer to execute the steps of: extracting a first characteristic word from the existing document information and a second characteristic word from the specific document information; calculating a first weight of the first characteristic word and a second weight of the second characteristic word following the extraction in the extracting step; modifying the first weight based on a specific condition following the calculation in the weight calculating step; controlling acquisition of the related information corresponding to the existing document information, based on the first characteristic word extracted in the extracting step and based on the first weight modified in the weight modifying step; searching for the existing document information related to the specific document information, based on the second characteristic word; and controlling display of the related information corresponding to the existing document information searched for in the searching step.

The acquisition controlling step may preferably include selecting, from a plurality of the first characteristic words in the existing document information, keywords based on the first weight in order to control acquisition of the related information about the keywords.

The searching step may preferably include calculating a similarity based on the first and the second weights in order to search for the existing document information corresponding to the specific document information based on the similarity.

The program of the invention may preferably include the step of extracting attribute information from the existing document information and the specific document information; wherein the weight modifying step may include modifying the first weight based on the attribute information extracted in the attribute information extracting step.

The program of the invention may further include preferably the step of grouping either one or a plurality of pieces of the existing document information into document information groups based on the attribute information extracted in the attribute information extracting step.

The weight modifying step may preferably include modifying the first weight in accordance with a frequency either of transmissions to a specific destination or of receptions from the specific destination.

The weight modifying step may preferably include modifying the first weight based on a type of the first characteristic word.

The program of the invention may preferably include the step of creating a database using the related information which acquisition controlled in the acquisition controlling step in relation to the first characteristic word in the existing document information.

The program of the invention may further include preferably the step of creating a category dictionary which is made up of groups of words in a specific data structure and which constitutes a database denoting relations between the words; wherein the weight modifying step may include modifying the first weight calculated in the weight calculating step, based on the category dictionary created in the category dictionary creating step.

The category dictionary may preferably constitute a database which has the word groups recorded in categories to which the words belong.

The category dictionary may preferably constitute a database which has the word groups recorded in a hierarchical structure based on the relations between the words.

The category dictionary may preferably constitute a database which has the word groups arranged in a list based on a degree of importance assigned to each of the words.

The category dictionary may preferably include the word groups and a data structure formed by those word groups which are derived from an existing dictionary database.

The category dictionary may preferably include the word groups and a data structure formed by those word groups which are derived from specific Web page data.

The category dictionary may include the word groups and a data structure formed by those word groups which are derived from a list of the second characteristic words used earlier in the searching step.

The weight modifying step may preferably include modifying the first weight of the first characteristic word corresponding to some of the words included in the category dictionary.

Where the information processing apparatus, information processing method, and program according to the invention are in use, a first and a second characteristic word are first extracted from existing document information and specific document information respectively. A first weight of the first characteristic word and a second weight of the second characteristic word are then calculated. After the first weight is modified in accordance with a given condition, related information corresponding to the existing information is acquired based on the first characteristic word and the first weight. A search is made for the existing document information related to the specific document information on the basis of the second characteristic word. The related information corresponding to the existing document information retrieved by the search is then displayed.

Other objects, features and advantages of the invention will become more apparent upon a reading of the following description and appended drawings.

BRIEF DESCRIPTION OF THE DRAWINGS

FIG. 9 is a schematic view of an agent being displayed on the desktop;

FIG. 17 is a schematic view of the agent making a recommendation to a user;

FIG. 29 is a schematic view of a user interface display on the screen, the display allowing the user to enter conditions under which to update the database;

FIG. 30 is a tabular view of characteristic vectors;

FIGS. 33A, 33B, and 33C are tabular views of characteristic vectors with their weights modified;

FIG. 35 is a tabular view of characteristic vectors with their weights modified;

FIG. 37 is a tabular view of characteristic vectors with their weights modified;

FIG. 41 is a schematic view of words arranged into groups based on keywords for search acquired by a server; and FIGS. 42A through 42E are schematic views showing how a plurality of display patterns are generated on the basis of the same attribute information.

DESCRIPTION OF THE PREFERRED EMBODIMENTS

Preferred embodiments of this invention will now be described with reference to the accompanying drawings.

Figure 1:
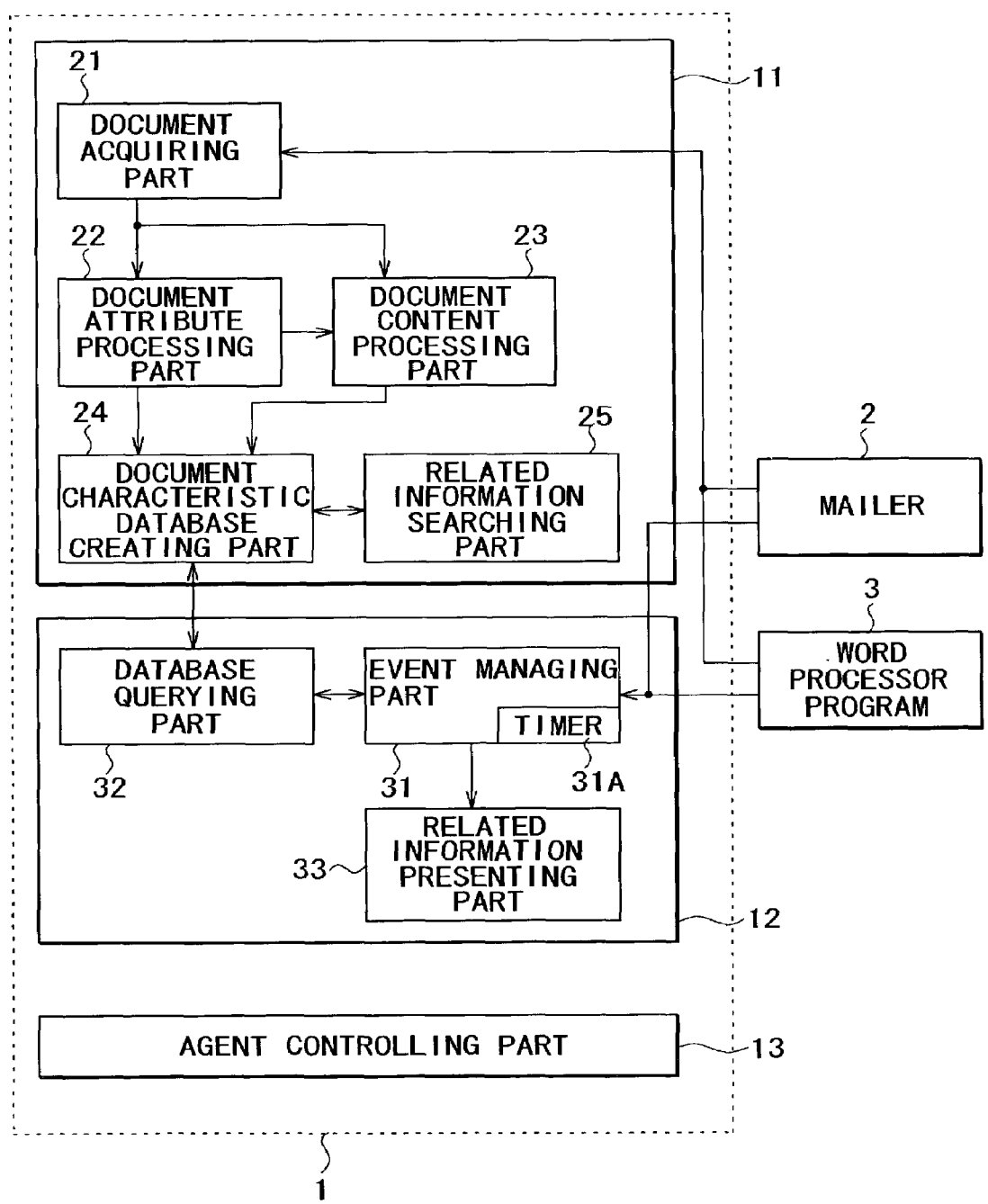
FIG. 1 is a schematic view showing a typical functional block structure of an agent program according to the invention.

FIG. 1 shows functional blocks of: an application program called the agent program 1 which displays a desktop mascot called the agent and which embodies the invention; an application program called the mailer 2 for exchanging e-mails; and a word processor program 3 for creating and editing documents. The agent program 1, mailer 2, and word processor program 3 are illustratively installed in and executed on a personal computer, to be described later in detail by referring to FIG. 2.

The agent program 1 comprises a storing part 11, a presenting part 12, and an agent controlling part 13. The storing part 11 constitutes a database that stores related information (to be described later) about target documents. The presenting part 12 presents the user with related information corresponding to the document being processed. The agent controlling part 13 controls actions of the agent 72 (see FIG. 9) on the screen.

In the storing part 11, a document acquiring part 21 supplies a document attribute processing part 22 and a document content processing part 23 with documents which are part of those sent or received by the mailer 2 or edited by the word processor program 3 and which are yet to be processed by the agent program 1. In the description that follows, the documents exchanged as emails by the mailer 2 will be cited as principal examples of documents.

The document attribute processing part 22 extracts attribute information from a document furnished by the text acquiring part 21, classifies the document into a group accordingly, and supplies the document to the document content processing part 23 and to a document characteristic database creating part 24. If the document is an e-mail, the document attribute processing part 22 extracts from its header such attribute information as a message ID identifying the e-mail in question, a message ID of the mail being referenced (References, In Reply-To), a destination (To, Cc, Bcc), a sender (From), a date, and/or a subject In keeping with the extracted attribute information, one or a plurality of documents are classified into group. The document groups (mail groups) classified by attribute information are each called a topic.

The document content processing part 23 extracts phrases and sentences from the document groups (topics) classified by the document attribute processing part 22, and subjects what is extracted to morphological analysis for classification into words (characteristic words). The words are classified by part of speech into nouns, adjectives, verbs, adverbs, conjunctions, interjections, postpositional particles (of Japanese), and auxiliary verbs. Ubiquitous parts of speech such as "Hello", "Thanking you in advance" and "Please" other than nouns and contained in almost all documents are excluded as unnecessary words because they cannot serve as keywords by which to search for related information.

With the unnecessary words excluded, the document content processing part 23 obtains the frequency of occurrence of each extracted word and its distribution throughout multiple documents. The document content processing part 23 then calculates a weight of each word per document group or topic (i.e., the weight is indicative of how relevant the word in question is to the topic). The calculation produces for each topic a characteristic vector having the weights of words as components. Illustratively, if the total number of words (characteristic words) in all topics is "n", then the characteristic vector of all topics is defined as a vector of an n-th dimensional space and is given as follows:

Characteristic vector=(weight w1 of word 1, weight w2 of word 2, ... , weight wn of word n)   (1)

Weights are calculated illustratively by use of the tf.idf method (Salton, G.: Automatic Text Processing: The Transformation, Analysis, and Retrieval of Information by Computer, Addison-Wesley, 1989). With this method in use, if a topic A contains "n" words, these words with their components constituting a characteristic vector of the topic A are suitably weighted by the method, whereas the words not included in the topic A are given zero weight because they do not occur in the topic.

In this specification, the characteristic vector will be shown calculated for each topic. Alternatively, the characteristic vector may be calculated for any other suitable unit (e.g., a group of documents accumulated over one week or over any other suitably predetermined period).

The document characteristic database creating part 24 creates a database by chronologically sorting attribute information per document group (i.e., topic) classified by the document attribute processing part 22 and the characteristic vector of each topic (i.e., weights of all words included in each topic) calculated by the document content processing part 23. The database thus created is retained in a storage unit 49 (FIG. 2) illustratively consisting of a hard disc drive. In keeping with the weights of extracted words, the document characteristic database creating part 24 selects those words selected that meet predetermined conditions and records the selected words as keywords (important words) by which to search for related information. Furthermore, the document characteristic database creating part 24 supplies such keywords to a related information searching part 25 to retrieve related information therefrom, and records the related information thus returned in correspondence with the keywords.

The related information searching part 25 searches for the related information corresponding to the keywords selected and recorded by the document characteristic database creating part 24. An index to the search result is returned by the searching part 25 to the document characteristic database creating part 24. A search for the related information corresponding to given keywords is carried out illustratively by use of a search engine on the Internet. In such a case, URLs (Uniform Resource Locators) of Web pages relevant to the keywords and the titles of these Web pages are returned as the related information to the document characteristic database creating part 24.

An event managing part 31 in the presenting part 12 detects specific occurrences such as termination of an e-mail transmission or reception by the mailer 2 and the amount of text data in the currently edited document exceeding a threshold value, and notifies a database querying part 32 thereof as events. In the description that follows, all such occurrences will be referred to as events.

The event managing part 31 comprises an internal timer 31A. This timer checks to see if a predetermined period of time has elapsed. Upon elapse of that period, the timer 31A notifies the database querying part 32 thereof.

In response to the notice of an event from the event managing part 31, the database querying part 32 acquires the document corresponding to the event in question (e.g., received e-mail). As with the document content processing part 23, the database querying part 32 subjects the acquired document to morphological analysis to extract words excluding unnecessary words, and calculates the weight of each extracted word. This produces a characteristic vector of the document corresponding to the event of interest.

The database querying part 32 searches through the database created by the document characteristic database creating part 24 to calculate scalar products of the characteristic vector of the document corresponding to the event and of the characteristic vector of each topic recorded in the database, the scalar products being indicative of similarities between the document and the topics. The database querying part 32 extracts the topic with the highest similarity, selects from the words within the extracted topic those that meet predetermined conditions (to be detailed later by referring to FIG. 6), retrieves related information corresponding to the selected words (i.e., keywords), and feeds the retrieved related information to a related information presenting part 33 either directly or via the event managing part 31.

Upon receipt of related information directly from the database querying part 32 or via the event managing part 31, the related information presenting part 33 displays the received information on a display unit 48 (i.e., desktop).

The database is updated by the storing part 11 at predetermined intervals. The database updating process will be described later with reference to the flowchart of FIG. 28. While the database is being updated by the storing part 11, the characteristic vectors held in the storage unit 49 are also modified illustratively to reflect the number of e-mails exchanged, transmission and reception status, or parts of speech (e.g., proper nouns indicating specific areas or particular entities). The characteristic vector modifying process will be described later with reference to the flowcharts of FIGS. 31, 34 and 36. Related information is presented by the presenting part 12 every time the event managing part 31 detects an event.

Figure 2:
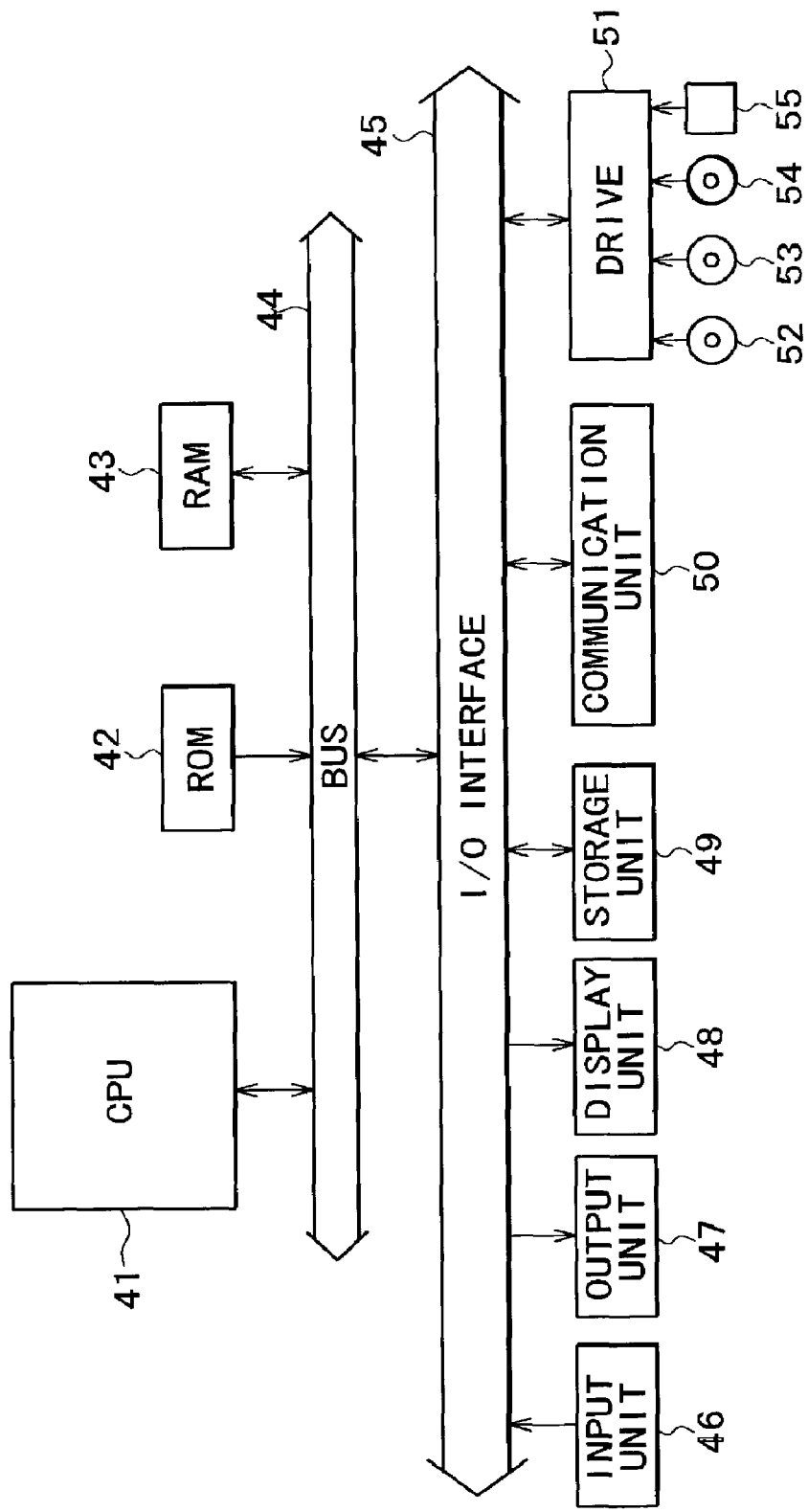
FIG. 2 is a block diagram depicting a typical structure of a personal computer in which the agent program is installed and executed.

FIG. 2 depicts a typical structure of a personal computer in which the agent program 1 is installed and executed. The personal computer comprises a CPU (central processing unit) 41. The CPU 41 is connected to an I/O interface 45 via a bus 44. The I/O interface 45 is connected with diverse components: an input unit 46 made up of input devices such as a keyboard and a mouse; an output unit 47 for outputting illustratively sound signals as a result of processing; the display unit 48 for displaying images as a result of processing; the storage unit 49 such as a hard disc drive for accommodating programs and data; a communication unit 50 such as a modem for communicating data over a LAN (local area network) or the Internet; and a drive 51 for writing and reading data to and from a program storage medium such as a magnetic disc 52, an optical disc 53, a magneto-optical disc 54, or a semiconductor memory 55. The bus 44 is connected with a ROM (read only memory) 42 and a RAM (random access memory) 43.

The agent program 1 of this invention is transported on the magnetic disc 52, optical disc 53, magneto-optical disc 54 or semiconductor memory 55 that is loaded into the drive 51. The program 1 is read from the loaded storage medium by the drive 51 and installed onto the hard disc drive in the storage unit 49. In response to a command entered by the user through the input unit 46, the CPU 41 causes the agent program 1 to be loaded from the storage unit 49 into the RAM 43 for execution. The agent program 1 may alternatively be set to be executed automatically whenever the personal computer is booted.

The hard disc drive in the storage unit 49 also contains application programs such as a WWW (World Wide Web) browser in addition to the agent program 1, mailer 2 and word processor program 3. As with the agent program 1, any of such application programs is loaded by the CPU 41 from the storage unit 49 into the RAM 43 for execution in response to a suitable command entered by the user through the input unit 46.

How the agent program 1 creates a database will now be described with reference to the flowchart of FIG. 3. The database creating process, one of the processes performed by the agent program 1, is started if a database is judged to be absent when the agent program 1 is executed.

Figure 3:
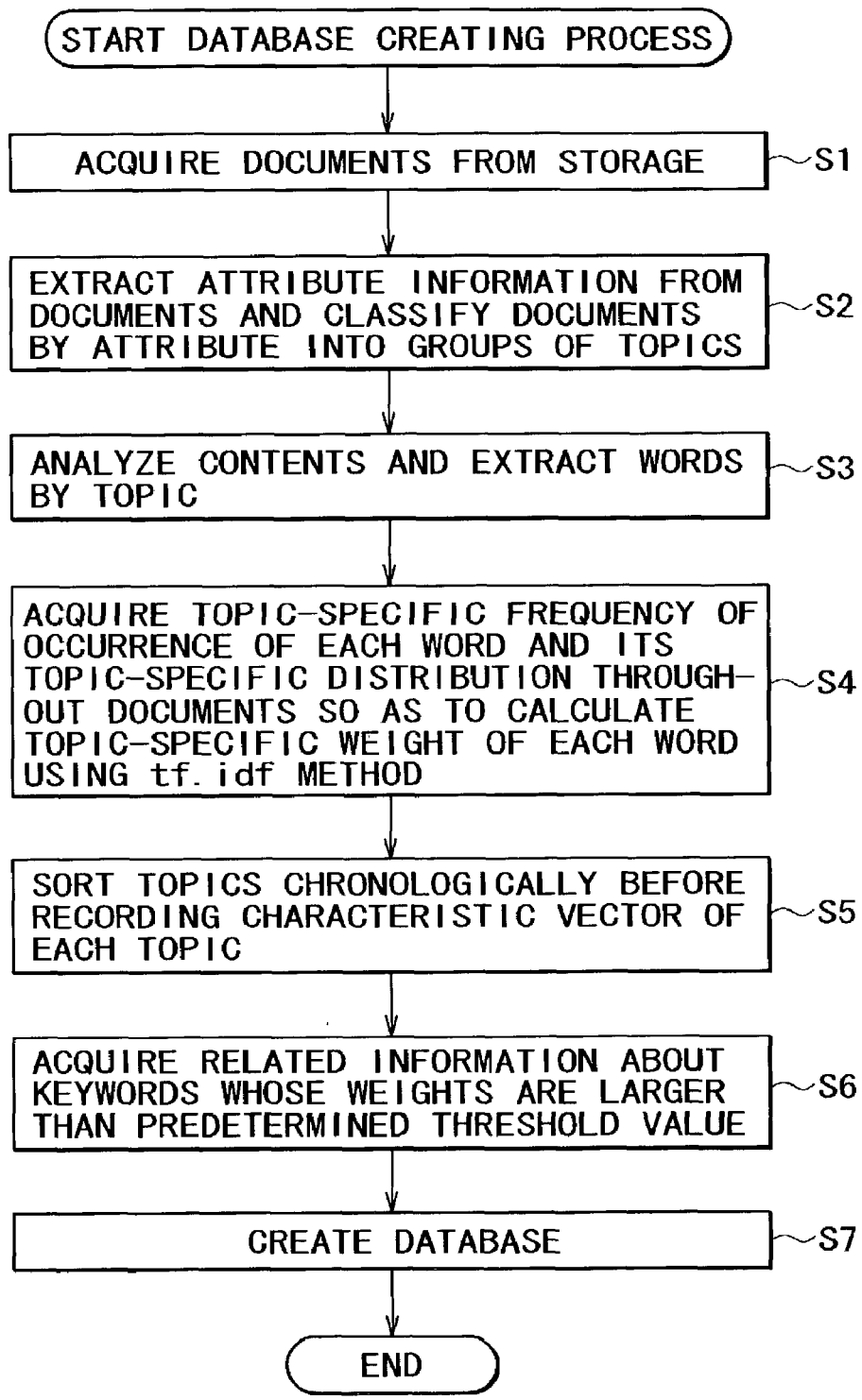
FIG. 3 is a flowchart of steps constituting a database creating process performed by the agent program.

In step S1 of FIG. 3, the document acquiring part 21 acquires unprocessed documents (e.g., e-mails sent or received prior to execution of the agent program 1) from the hard disc drive in the storage unit 49. The acquired documents are supplied to the document attribute processing part 22 and document content processing part 23.

In step S2, the document attribute processing part 22 extracts attribute information (header information such as message IDs) from the e-mail documents acquired and furnished by the document acquiring part 21. Based on the attribute information thus extracted, the document attribute processing part 22 classifies the documents into groups of topics (i.e., one group represents one topic) and feeds the document groups to the document content processing part 23 and document characteristic database creating part 24.

In step S3, the document content processing part 23 extracts text data from the document groups (topics) classified by the document attribute processing part 22 in step S2, and subjects the text data to morphological analysis so as to extract words (characteristic words) excluding unnecessary words. In step S4, the document content processing part 23 obtains the frequency of occurrence of each word extracted in step S3 and the distribution status of each of these words throughout a plurality of documents, and calculates the weight of each word in each topic using illustratively the tf.idf method.

In step S5, the document characteristic database creating part 24 creates a database that contains the attribute information about each document for each topic following the classification by the document attribute processing part 22 in step S2, and the weights of all words in each topic (i.e., characteristic vector of the topic) following the calculation by the document content processing part 23 in step S3.

Figure 4:
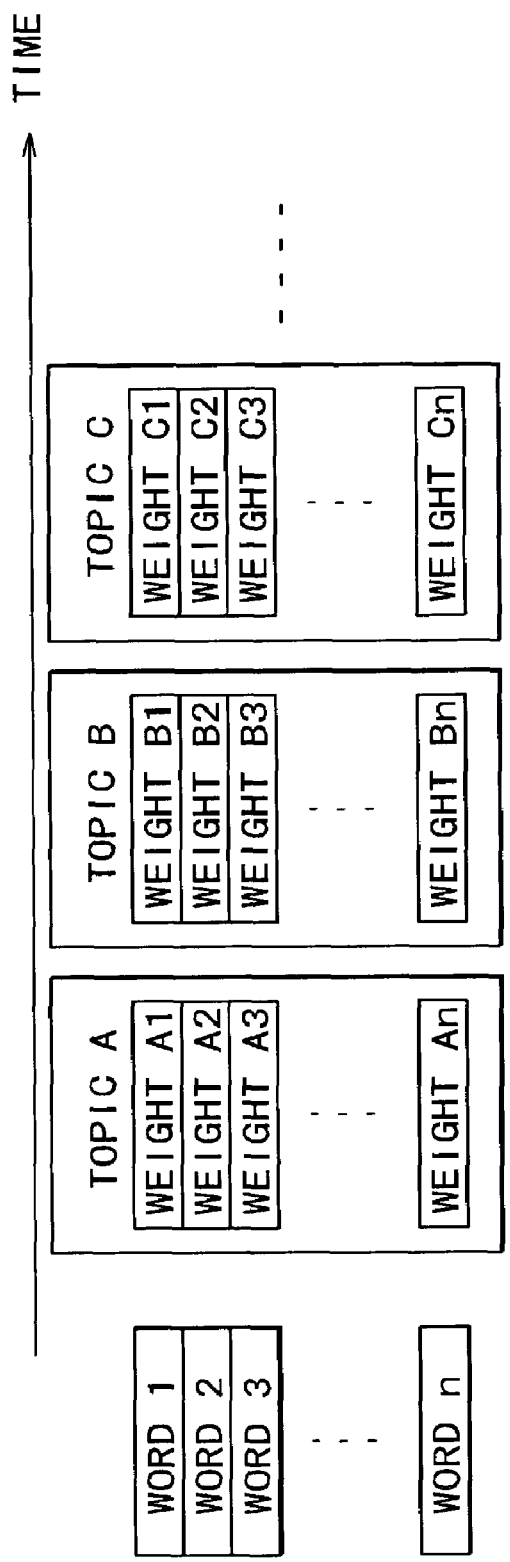
FIG. 4 is a schematic view explaining what takes place in step S5 of FIG. 3.

More specifically, as shown in FIG. 4, the grouped topics (topic A, topic B, etc.) are sorted chronologically, and the weight of each of the words 1 through "n" in each topic are sorted likewise before being recorded to the storage unit 49. In FIG. 4, a weight A1 represents the weight of a word 1 in a topic A, and a weight B2 denotes the weight of a word 2 in a topic B. If the word 1 is not included in the topic B, then the weight B1 is zero.

Returning to step S6 in FIG. 3, the document characteristic database creating part 24 selects as keywords either the words whose weights are larger than a predetermined threshold value or a predetermined number of words sorted in the descending order of weights. The keywords thus selected are fed to the related information searching part 25. Using the keywords from the document characteristic database creating part 24 as search conditions, the related information searching part 25 gains access to a search engine on the Internet to acquire relevant information. The URLs of the acquired Web pages and their titles are output by the related information searching part 25 to the document characteristic database creating part 24 as related information.

In step S7, the document characteristic database creating part 24 creates the database by recording the related information from the related information searching part 25 in correspondence with the keywords in the storage unit 49. Steps S6 and S7 are carried out either continuously following step S5, or in a suitably timed manner apart from the preceding steps.

Carrying out the database creating process above produces a database that accumulates related information corresponding to the documents of e-mails that have been sent out or received. Although the database creating process was shown started upon execution of the agent program 1, this is not limitative of the invention. Alternatively, the process may be started at any time desired. The database thus created is updated when certain conditions are met (when to update the database will be discussed later with reference to FIG. 29).

It may be desired to interrupt the database creating process halfway during execution at the user's discretion. This can be accomplished by recording the documents that have been processed up to the time when an interrupt command is issued by the user. When requested to be resumed, the process will then start dealing with unprocessed documents.

How the agent program 1 presents related information to the user will now be described by referring to the flowchart of FIG. 5. Unlike the database creating process discussed above with reference to FIG. 3, the related information presenting process is carried out repeatedly during execution of the agent program 1.

Figure 5:
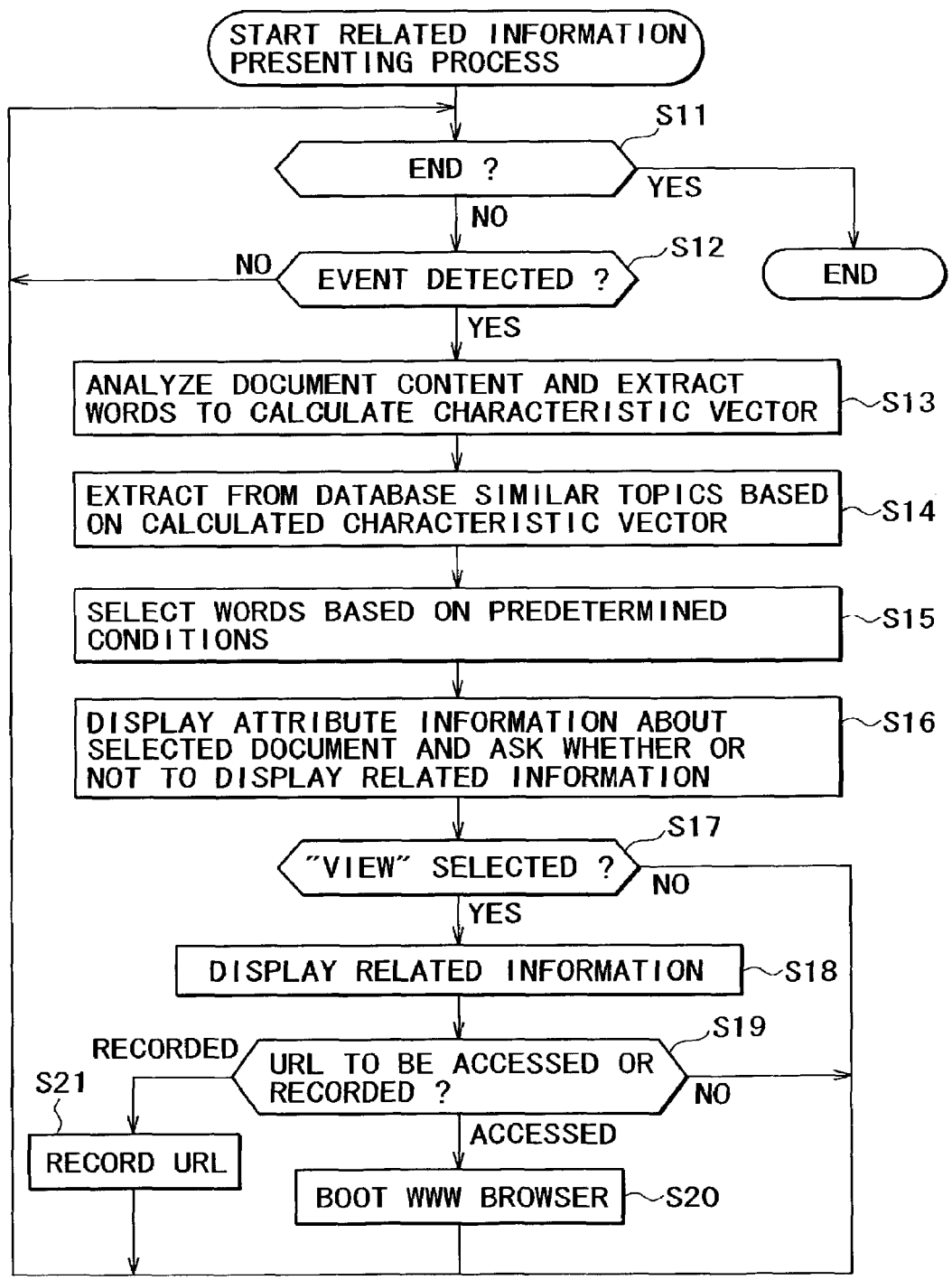
FIG. 5 is a flowchart of steps constituting a related information presenting process performed by the agent program.

In step S11 of FIG. 5, the agent program 1 judges whether or not a command entered by the user through the input unit 46 designates termination of the program 1. If termination of the agent program 1 is not judged to be designated, step S12 is reached.

In step S12, the event managing part 31 checks to see if an event has occurred (e.g., end of an e-mail transmission or reception by the mailer 2). If no event is detected, control is returned to step S11 and the subsequent steps are repeated.

If an event is detected in step S12, then step S13 is reached. In step S13, the event managing part 31 notifies the database querying part 32 that an event has occurred. Given the notice of occurrence of the event from the event managing part 31, the database querying part 32 acquires the document corresponding to the event in question (e.g., e-mail transmitted or received), analyzes the document morphologically to extract words (characteristic words) excluding unnecessary words, and computes the weight of each of the extracted words. This step calculates the characteristic vector of the document corresponding to the event of interest.

In step S14, the database querying part 32 searches through the database created by the document characteristic database creating part 24, and calculates scalar products of the characteristic vector computed in step S13 and of the characteristic vectors of the topics recorded in the database, the scalar products being indicative of similarities between the document in question and the topics. The database querying part 32 extracts the topic or topics with their similarities meeting predetermined conditions (e.g., the topic with the highest similarity, or topics with their similarities exceeding a specific threshold value).

Preferably, one condition for selecting a topic may require that the topic belong to a certain period in the past and that the topic excludes the most frequently used words in recently exchanged e-mails in terms of the word weights constituting the characteristic vector. The period of time relevant to a given topic may be determined by any one of the starting, ending, or average date of the outgoing and/or incoming e-mails making up the topic. This makes it possible to extract the topic that was discussed in the past, has been forgotten, but may still attract the user's attention if invoked. The user may then be pleasantly surprised and find his or her potential interest stirred up by what is being offered.

In step S15, the database querying part 32 selects, from the words in the topic extracted in step S14, those words (keywords) that meet conditions 1 and 2 in terms of their weights having been changed over time.

The process of step S15 is not mandatory. Alternatively, of the items of related information which are associated with the topic acquired in step S6 and selected in step S14, those may be preferentially selected which correspond to a certain number of words having the largest weights determined in step S6 or which are yet to be displayed. Either one or any number of items of the related information may be displayed.

Figure 6:
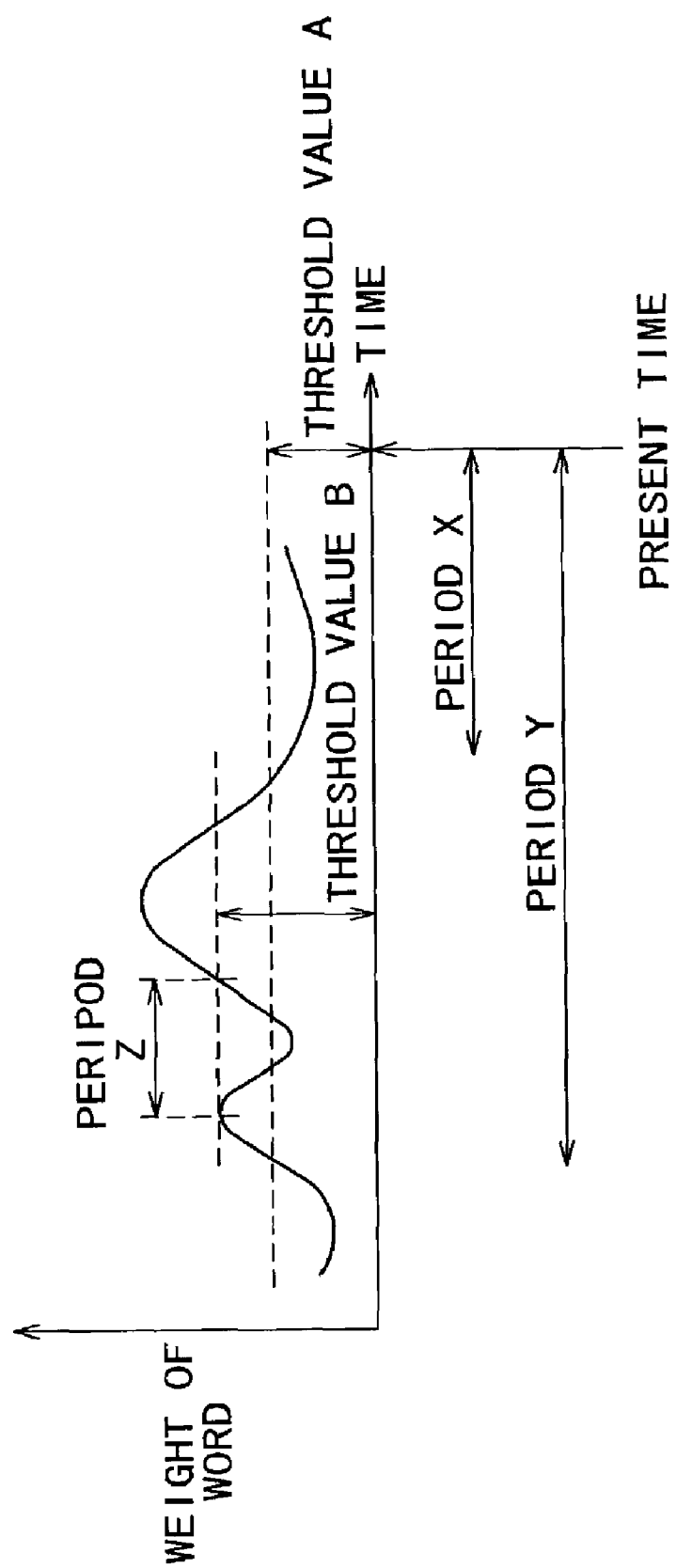
FIG. 6 is a schematic view explaining what takes place in step S15 of FIG. 5.

The conditions according to which words are selected will now be described by referring to FIG. 6. FIG. 6 depicts how the weight of a word in the database is changed illustratively over time.

For example, a condition 1 may stipulate that the weight of each word be less than a predetermined threshold value A over a period X (e.g., two weeks) prior to the present time, and a condition 2 may require that the word belong to at least two topics and have a weight greater than a predetermined threshold value B over a period Y (e.g., five weeks) before the present time. Preferably, a condition 3 may be added to require that there exists at least a period Z between the oldest and the most recent of the multiple topics to which each word complying with the condition 2 belongs.

Applying the conditions above to the selecting process makes it possible to extract the words (keywords) likely to attract the user's attention. In particular, the condition 1 excludes two kinds of words: the words included in topics close to the present time, and the words in topics of the distant past. This makes it possible to avoid selecting two kinds of related information: information about what is currently on the user's mind, i.e., something that is predictable (i.e., information too new to be attractive); and information related to what occurred far too in the past to be remembered (information too old to be interesting).

The database querying part 32 supplies the related information presenting part 33 with the related information corresponding to the selected words (keywords) either directly or via the event managing part 31.

Returning to step S16 of FIG. 5, the agent controlling part 13 displays the attribute information about the documents containing the words selected in step S15 together with the reasons for the selection (i.e., recommendation). At the same time, the agent controlling part 13 displays on the desktop an input window 81 (FIG. 14) asking the user whether or not to display the related information corresponding to the keywords.

Since each topic covers a plurality of grouped documents, there may well be multiple documents containing the keywords (i.e., a plurality of items of attribute information may exist regarding the documents containing the keywords). In such a case, the attribute information about the oldest or the most recent of the documents including the keywords, or the attribute information of the documents specified arbitrarily may be displayed. Related information may be displayed directly on the desktop without recourse to the input window 81.

In step S17, the agent program 1 checks the command entered by the user through the input unit 46, to determine whether the user has selected a "view" button in the input window 81 displayed in step S16. If in step S17 the user is judged to have selected the "view" button, then step S18 is reached. In addition to the "view" button paired with a "don't view" button, the input window 81 may include buttons to display other information or to suppress information display.

In step S18, the related information presenting part 33 displays on the desktop the related information supplied from the database querying part 32 via the event managing part 31. One or multiple items of related information may be presented on the desktop.

The information displayed as related information may or may not be the titles of Web pages, provided the information has been retrieved from the database in correspondence with keywords. Illustratively, an index pointing to more detailed information held in other databases may be displayed. On viewing the index, the user may issue an access command to have the detailed information displayed.

In step S19, the agent program 1 judges whether the user has issued a command to access any of the Web page titles displayed as related information in step S18. If the access command is judged to be issued, step S20 is reached in which the WWW browser is booted for access to the corresponding Web page.

If in step S19 the user is judged to have issued a command to record any of the Web page titles displayed as related information in step S18, then step S21 is reached. In step S21, the agent program 1 records the title and URL of the corresponding Web page to a scrapbook window 74 (FIG. 9) that displays presentation history. If in step S19 the user is judged to have issued no command over a predetermined period of time, then step S20 or S21 is skipped, control is returned to step S11, and the subsequent steps are repeated.

If in step S17 the user is not judged to have selected the "view" button, then steps S18 through S21 are skipped, control is returned to step S11, and the subsequent steps are repeated. If in step S11 the user is judged to designate termination of the agent program 1, the process is brought to an end.

What follows is a description of a method for efficiently acquiring e-mails corresponding to detected events in connection with the related information presenting process.

It should be noted that most mailer programs have four distinct characteristics regarding the format in which to retain e-mails. First, each folder of the mailer corresponds to one mailbox file of the personal computer. Second, each newly received e-mail is placed into a specific folder. On the personal computer, these mails are added to the end of a file corresponding to the folder. In that case, one file generally contains a plurality of e-mails that are distinguished from one another using a line made of a particular character string pattern (which varies from one mailer to another) inserted as an inter-mail boundary. Third, outgoing emails are preserved in a specific file in the same format as incoming e-mails in their own file. Fourth, the files that contain incoming and outgoing mails generally have a large size each (from hundreds of kilobytes to one megabyte).

The first through the fourth characteristics outlined above are taken into account when an e-mail corresponding to a detected event is acquired illustratively as follows: the time stamp of the mailbox file is first checked to see whether or not any new mail has been added there. If a new e-mail is judged to have been added, the mailbox file is checked from end to start, line by line, for a specific character string denoting a boundary between mails. When the character string is detected, the data ranging from that boundary to the end of the mailbox file are extracted as a mail body. The method above allows e-mails associated with detected events to be acquired efficiently.

Described below is a method for suppressing repeated presentation of related information about the same e-mail in the course of the related information presenting process. First, a data structure is established in which to record the message IDs of e-mails for which related information is presented. When an event is detected, the message ID of the e-mail corresponding to that event is acquired and compared with the established data structure. If the same message ID is found in the data structure, that means the related information has already been presented in connection with that e-mail. In such a case, the related information will not be presented further. If the same message ID is not found in the data structure, that means the related information is yet to be presented with regard to the mail. The related information is then presented and the message ID in question is recorded in the data structure. Implementing the method above suppresses repeated presentation of related information about the same e-mail.

Figure 7:
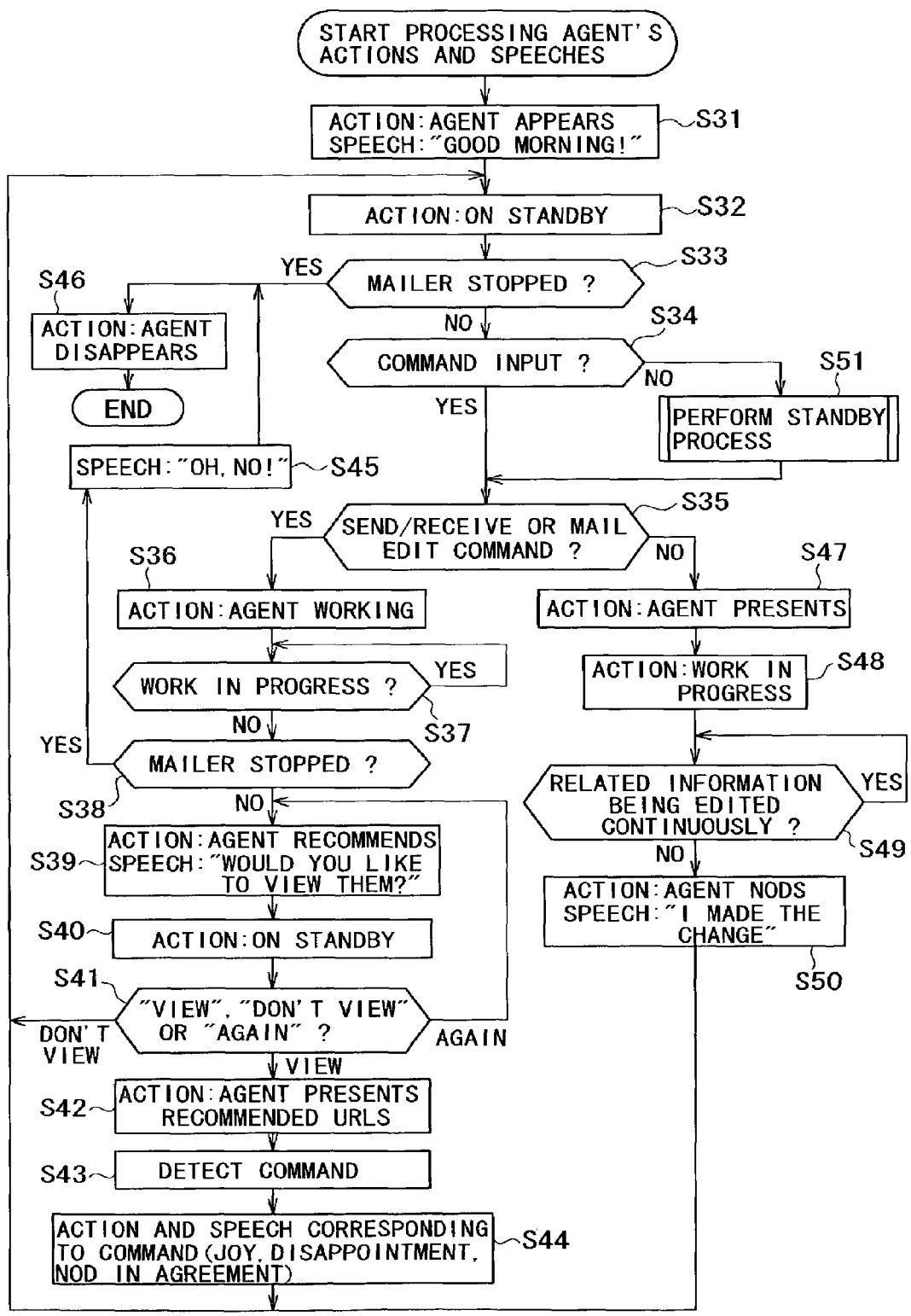
FIG. 7 is a flowchart of steps constituting processes of causing the agent to move and do other things.
Figure 8:
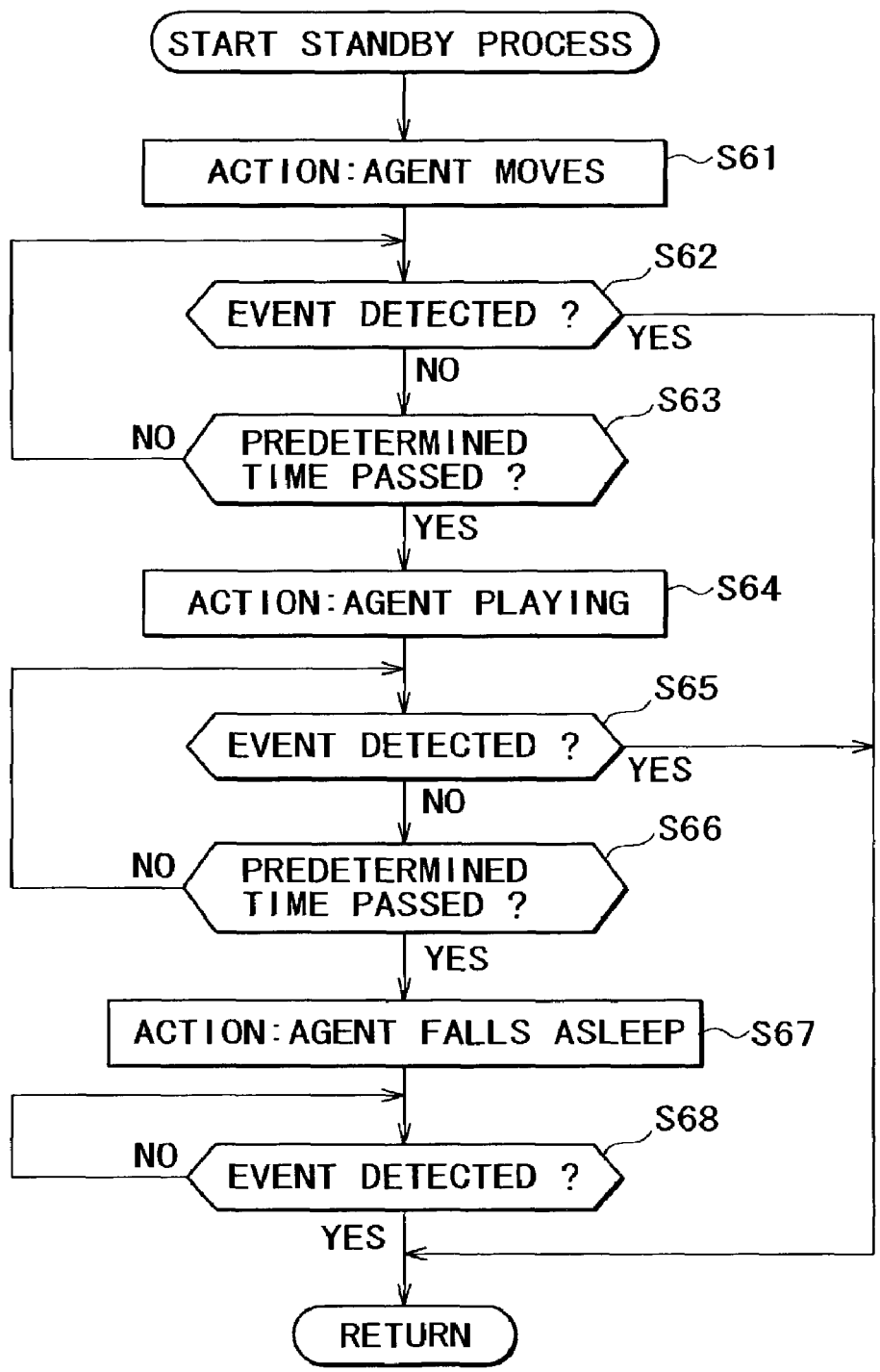
FIG. 8 is a flowchart of steps detailing the standby process in step S51 of FIG. 7.
Figure 10A:
FIGS. 10A, 10B, 10C, and 10D are schematic views of the agent making an appearance on the screen.
Figure 10B:
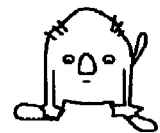
Figure 10C:
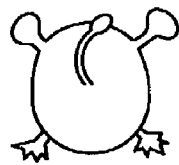
Figure 10D:
Figure 11:
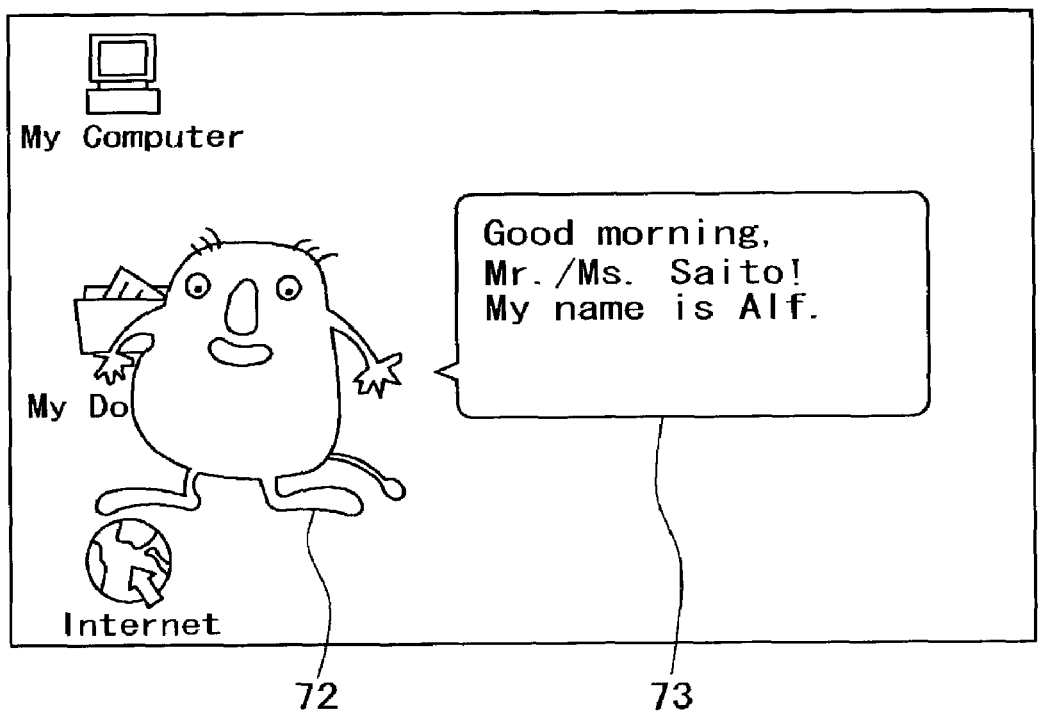
FIG. 11 is a schematic view of the agent making a speech in a balloon.

Described below in detail with reference to the flowcharts of FIGS. 7 and 8 is how the agent is controlled in actions and speeches in the course of the related information presenting process discussed by referring to FIG. 5.

Figure 9:
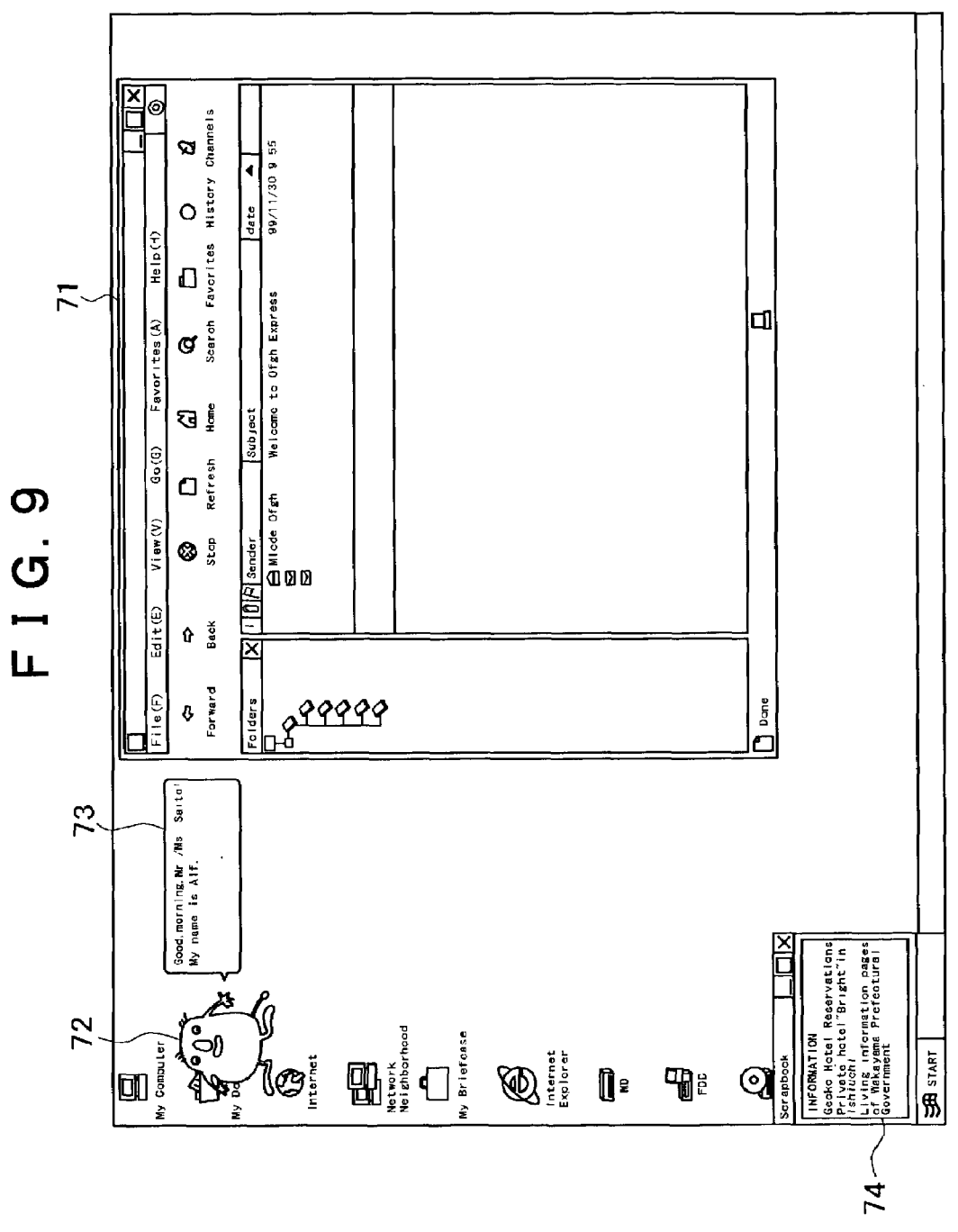

When the mailer 2 is booted while the agent program 1 is being active, step S31 of FIG. 7 is reached first. In step S31, the agent controlling part 13 causes an agent 72 to appear (i.e., displayed) on the desktop in a location not overlapping with a window 71 of the mailer 2 (called the mailer window), as shown in FIG. 9.

When appearing on the screen, the agent 72 executes a forward roll. The agent 72 is shown making its dynamic appearance when the images in FIGS. 10A through 10D are displayed successively. With the agent 72 on the desktop, a balloon 73 appears indicating the agent's speech along with a scrapbook window 74 (to be discussed later) giving a list of related information in storage. The balloon 73 illustratively contains the agent's greetings ("Good morning, Mr./Ms. SAITO!") and its self-introduction ("My name is Alf").

In synchronism with the display of the balloon 73, the speech in the balloon 73 may be output in sound by a sound synthesizing part (not shown). Sound signals generated by the sound synthesizing part for audible output of the speech in the balloon 73 may be in Japanese, in English, or in any other language as long as they denote the same meaning ("Good morning, Mr./Ms. SAITO! My name is Alf."). Sound signals may also be generated and output in synchronism with other speeches that may appear in subsequently displayed balloons 73.

The balloon 73 or the sound corresponding to the speech therein may be suppressed if so desired. In subsequent processes, whether or not to display the balloon 73 and output the corresponding sound may be determined either by the agent program 1 according to suitable criteria or by the user at his or her discretion.

Figure 12:
FIG. 12 is a schematic view of the agent in its standby state.

In step S32 of FIG. 7, display of the agent 72 is shifted illustratively to a moving image in standby mode as shown in FIG. 12 (e.g., with the agent's hands clasped behind its back and its toes moving up and down).

In step S33, the agent program judges whether or not the mailer 2 is terminated on the basis of a command entered by the user through the input unit 46. If the mailer 2 is not judged to be terminated, step S34 is reached.

In step S34 (corresponding to step S12 in FIG. 5), the mailer 2 judges whether or not the user has entered any command (for sending or receiving an e-mail, editing an e-mail, or editing related information). If any such command is judged to be entered, step S35 is reached in which the action designated by the command is started.

In step S35, the event managing part 31 of the agent program 1 judges whether or not any command for sending or receiving an e-mail or editing an e-mail or related information is input. If any such command is judged to be input, step S36 is reached.

Figure 13:
FIG. 13 is a schematic view of the agent working.

In step S36, the agent controlling part 13 shifts display of the agent 72 from the standby state in FIG. 12 to a moving image indicating the agent 72 at work (e.g., with its hands and feet flailing rapidly), as shown in FIG. 13. Meanwhile, steps S13 through S15 of FIG. 5 are carried out (to select the related information to be recommended to the user).

In step S37, the agent program 1 checks to see whether or not the action started by the mailer 2 in response to the input command (e.g., for sending an e-mail) is still in progress. The check is repeated until the action of the mailer 2 is terminated. More specifically, until the action of the mailer 2 is stopped, the agent controlling part 13 remains in standby mode while maintaining the "at-work" display of the agent 72 as indicated in FIG. 13.

If in step S37 the action of the mailer 2 is not judged to be in progress, i.e., if the action started by the mailer 2 in response to the input command is found terminated, then step S38 is reached.

In step S38, the agent program 1 again judges whether or not the mailer 2 is terminated by the command entered by the user through the input unit 46. If the mailer 2 is not judged to be terminated, then step S39 is reached.

In step S39 (corresponding to step S16 in FIG. 5), the agent controlling part 13, if the action of the mailer 2 in step S37 is the transmission of an e-mail, causes a speech to appear in the balloon 73 of the agent 72. The speech runs illustratively like this: "I see you have just sent an e-mail to Mr./Ms. A. You talked to Mr./Ms. A about (a particular title) on (a specific date in the past), didn't you? I have found some Web pages related to (a keyword or keywords) in that mail. Would you like to view the pages?"

If the action of the mailer 2 in step S37 is the reception of an e-mail, the agent controlling part 13 changes the initial part of the speech like this: "I see you have just received an e-mail from Mr./Ms. A." If the action of the mailer 2 is the editing of an e-mail, the initial part of the speech is changed to something like this: "I see you are writing an e-mail to Mr./Ms. A." That part of the speech which is given as, "You talked to Mr./Ms. A about (a particular title) on (a specific date in the past), didn't you?" represents the reason why the related information has been selected (i.e., recommended). Alternatively, the reason for selecting the related information may not be displayed in step S39. Instead, the reason may be displayed after the processing of step S42 (i.e., display of related information), to be described later. It is also possible to display the reason for selecting the related information at any time desired by the user (e.g., where arrangements are made to provide a "reason is . . . " command in the menu).

When the elapsed time based on the timer 31A is presented (i.e., periodically), the agent's speech giving the chronological information should not refer directly to a specific event like this: "I see you have just received an e-mail from Mr./Ms. A." Instead, the wording should be such as to merely touch on the date like this: "you talked to Mr./Ms. A on (a particular date) about (a specific title)." The balloon 73 may be displayed either before or after the related information is presented.

Figure 14:
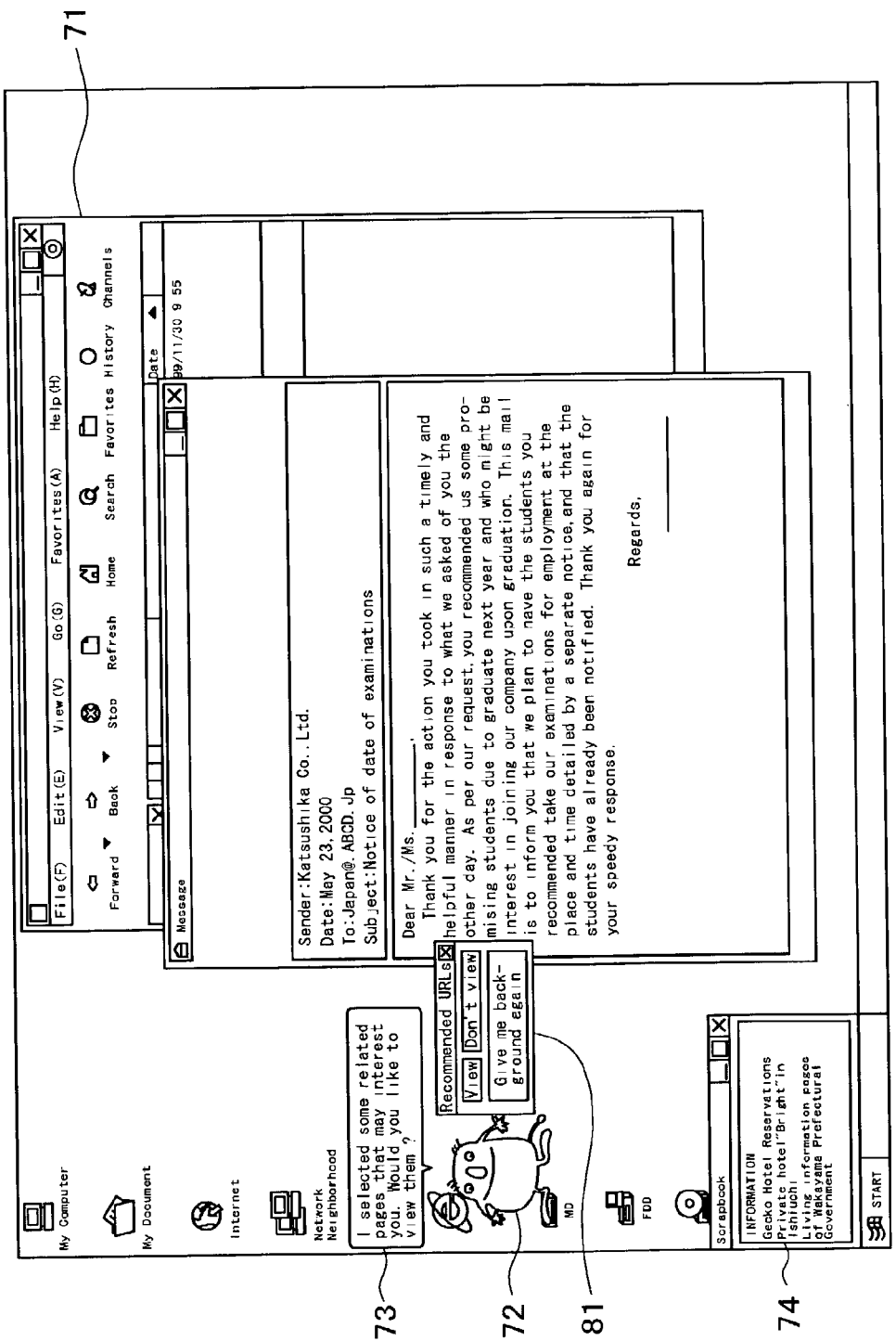
FIG. 14 is a schematic view of an input window displayed on the desktop.
Figure 15:
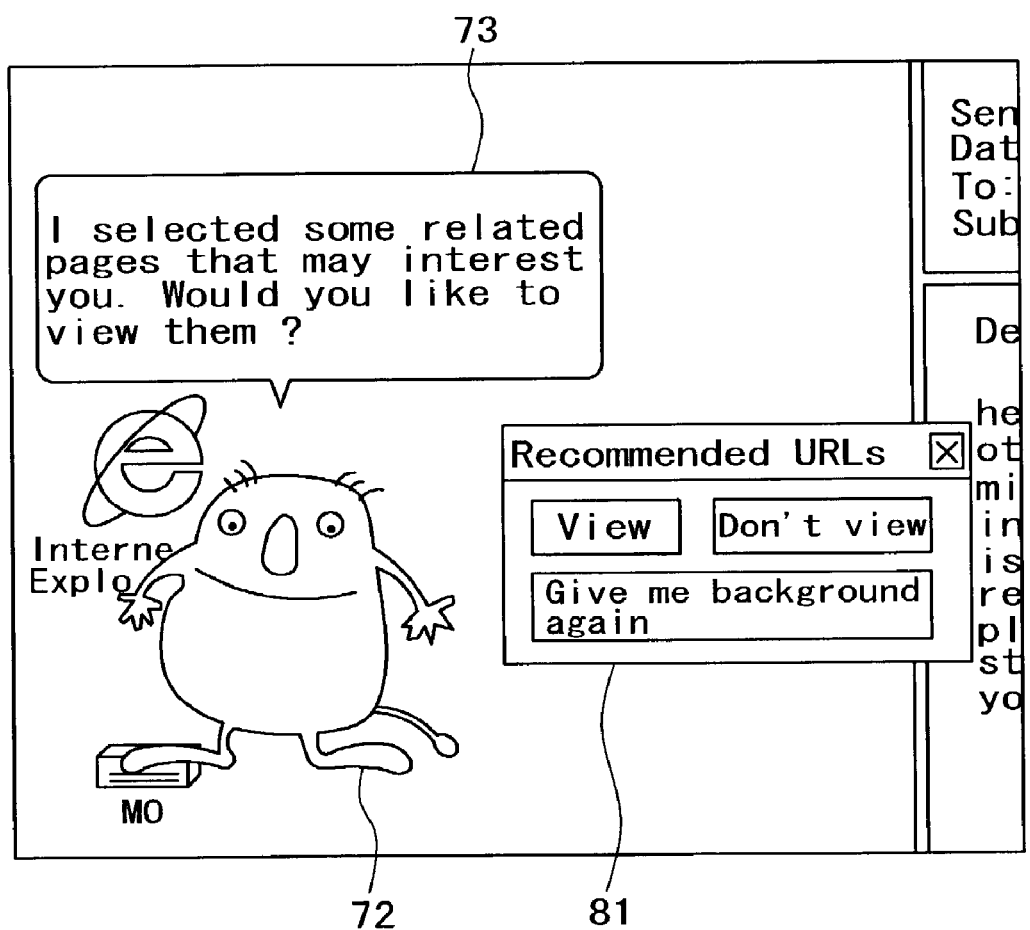
FIG. 15 is a schematic view of an input window.

Adjacent to the balloon 73 appears the input window 81 as illustrated in FIG. 14, for example. The input window 81, as shown in FIG. 15, includes three buttons: a "view" button selected to designate display of related information; a "don't view" button used to suppress display of related information; and a "give me background again" button operated to specify a repeated display of the background (i.e., the reason) against which the related information has been selected.

In step S40, with the input window 81 on display, the agent controlling part 13 shifts display of the agent 72 to a moving image in standby mode shown in FIG. 14. In step S41 (corresponding to step S17 in FIG. 5), the agent program 1 determines which of the three buttons, "view," "don't view" and "give me background again" in the input window 81, has been selected by the user. Display of the input window 81 is optional.

Figure 16:
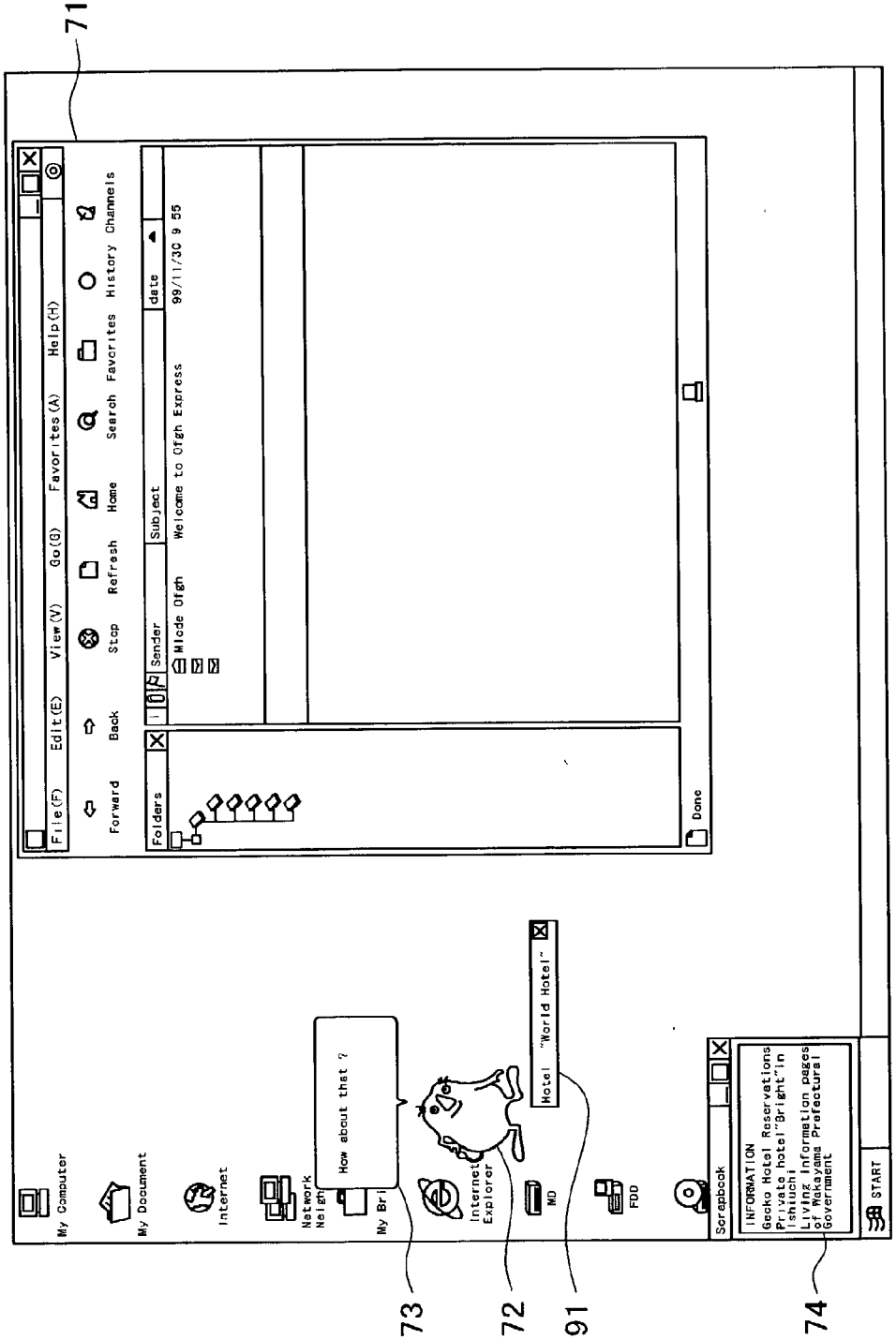
FIG. 16 is a schematic view of how recommended URLs are displayed on the desktop.

If in step S41 the "view" button is judged to be selected inside the input window 81, then step S42 is reached. In step S42 (corresponding to step S18 in FIG. 5), the agent controlling part 13 displays recommended URLs 91 as related information, as shown in FIGS. 16 and 17. The agent controlling part 13 further shifts display of the agent 72 to a moving image pointing to the recommended URLs 91 on display, and causes a speech "How about that?" to appear in the balloon 73. The recommended URLs 91 are usually represented by the titles of the recommended Web pages. Only when a mouse cursor is placed on any of the recommended URLs 91, does the URL of interest appear in overlapping fashion. The recommended URLs may be relocated when dragged by use of the mouse cursor.

In step S43 (corresponding to step S19 in FIG. 5), the agent program 1 detects the command entered by the user with regard to the recommended URLs 91 on display. One of three commands may be entered: one for recording, another for access, and another for erasure.

The command for recording any of the recommended URLs 91 is executed illustratively by drag-and-dropping the desired URL recommended into the scrapbook window 74, or by right-clicking the mouse on the URL in question and selecting "record" from the displayed menu. Alternatively, all recommended URLs 91 may be automatically recorded. The access or erasure command is similarly executed, by drag-and-dropping the desired URL onto the icon of the WWW browser or into the recycle bin, by right-clicking the mouse on the URL and selecting the relevant command from the displayed menu, or by having the recommended URLs rendered clickable.

Figure 18:
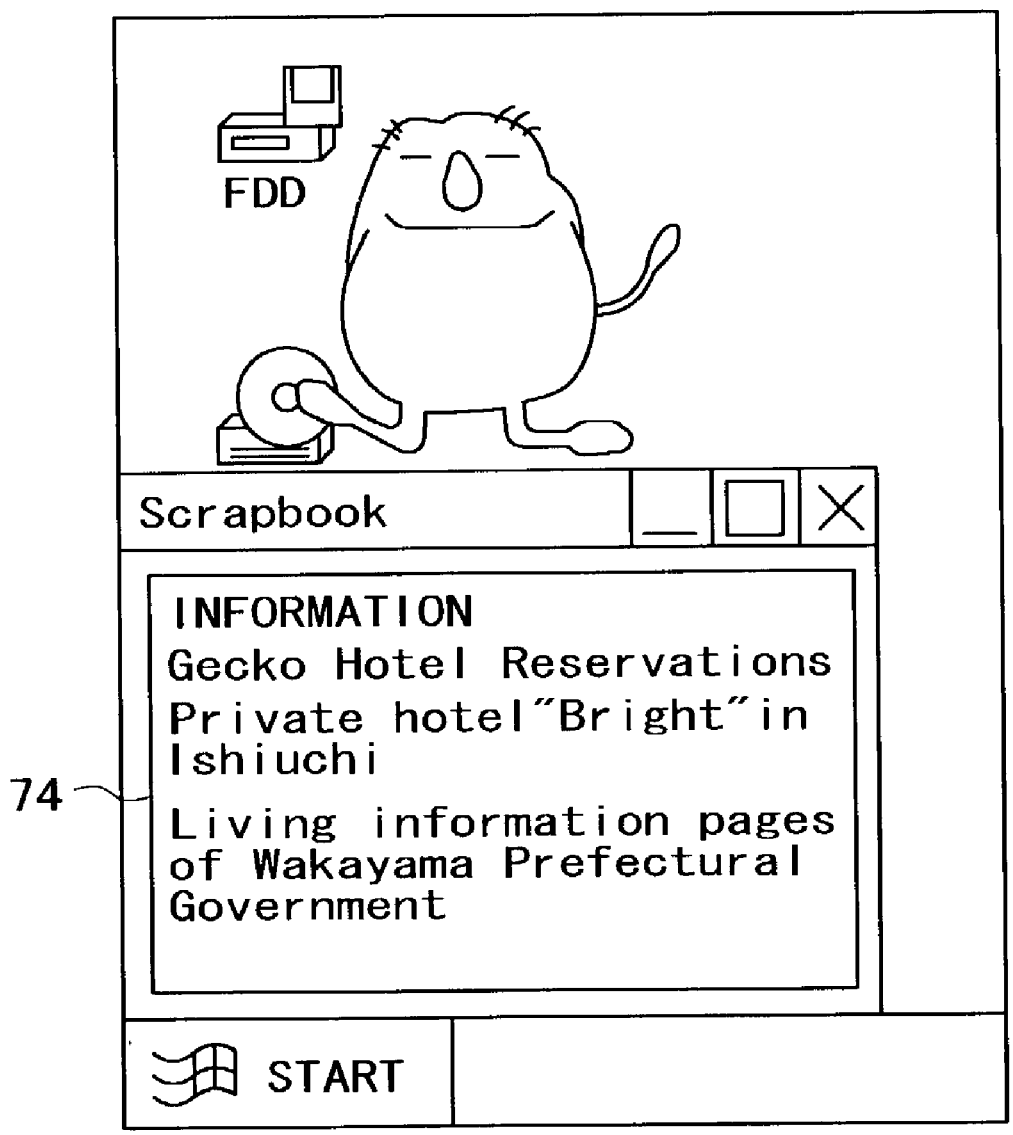
FIG. 18 is a schematic view of a scrapbook window displayed on the desktop.

If the command detected in step S43 is one for recording any of the recommended URLs 91, then step S44 is reached (corresponding to step S21 in FIG. 5). In step S44, the agent controlling part 13 shifts display of the agent 72 to a nodding image as shown in FIG. 18, for example. At this point, the title of the Web page corresponding to the recommended URL 91 selected for recording is added into the scrapbook window 74.

Figure 19A:
FIGS. 19A and 19B are schematic views of the agent expressing joy on the screen.
Figure 19B:
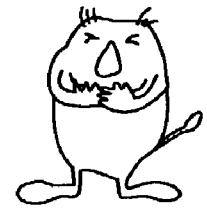

If the command detected in step S43 is one for access to any of the recommended URLs 91, then step S44 is reached (this time the step corresponds to step S20 in FIG. 5). In step S44, the agent controlling part 13 shifts display of the agent 72 to a joyful image full of smiles as shown in FIGS. 19A and 19B. The balloon 73 displays a speech "Okay!" and a corresponding sound signal is output.

Figure 20A:
FIGS. 20A and 20B are schematic views of the agent expressing sadness on the screen.
Figure 20B:

If the command detected in step S43 is one for erasure to any of the recommended URLs 91, step S44 is reached in which the agent controlling part 13 displays a sad, disappointed image of the agent 72 with a crying face as shown in FIGS. 20A and 20B. The balloon 73 displays a speech "I'm rejected!" and a corresponding sound signal is output.

After the action of step S44 is completed, control is returned to step S32. The subsequent steps are then repeated.

If in step S41 the "don't view" button is judged to be selected inside the input window 81, then step S32 is reached again and the subsequent steps are repeated. If in step S41 the "give me background again" button is judged operated, control is returned to step S39, and steps S39 through S41 are repeated.

If in step S38 the mailer 2 is judged to be terminated, then step S45 is reached. In step S45, the agent controlling part 13 displays a speech "Oh, no!" in the balloon 73 and outputs a corresponding sound signal. Step S45 is followed by step S46 in which the agent 72 is made to disappear (in a manner described later by referring to FIGS. 25A and 25B).

If the command entered in step S35 is judged to be one for editing related information, then step S47 is reached. In step S47, the related information presenting part 33 displays a related information editing window (not shown). The agent controlling part 13 shifts display of the agent 72 from the standby state of FIG. 18 to the image pointing to the window, the same as in the example of FIG. 17. When the user later starts making edit input to the related information editing window, step S48 is reached in which the agent controlling part 13 shifts display of the agent 72 from the window-pointing image to the moving image showing the agent 72 at work as indicated in FIG. 13.

In step S49, the agent program 1 checks to see whether the related information editing process is still in progress. The check is repeated until the editing process is judged terminated. More specifically, until the related information editing process is stopped, the agent controlling part 13 maintains the "at-work" image of the agent 72 shown in FIG. 13.

If in step S49 the related information editing process is not judged to be in progress, i.e., if the process is found terminated after getting started in response to the edit command entered, then step S50 is reached.

In step S50, the agent controlling part 13 shifts display of the agent 72 to the nodding image shown in FIG. 18. The balloon 73 displays a speech "I made the changes" and a corresponding sound signal is output. Step S50 is followed by step S32, and the subsequent steps are repeated.

If in step S34 no command is judged to be entered by the user into the mailer 2 longer than a predetermined period of time, step S51 is reached. In step S51, the agent controlling part 13 carries out a standby process in displaying the agent 72. In this step, the agent's image is shifted in a loop from a moving to a playing to a sleeping state at predetermined intervals. The standby process of step S51, of which detailed steps are performed by the agent controlling part 13, is described below by referring to the flowchart of FIG. 8.

In step S61 of FIG. 8, display of the agent 72 is shifted from the standby state of FIG. 12 to a moving state represented by the moving images in FIGS. 21A through D or in FIGS. 22A through 22G, for example.

The agent 72 is moved horizontally or vertically on the desktop in a manner not overlapping with the currently displayed window. Alternatively, an active window (i.e., mailer window 71 in this case) may be detected and the agent 72 may be moved around the detected window horizontally or vertically. If the agent 72 is arranged to move horizontally (e.g., rightward) on the desktop, images such as those in FIGS. 21A through 21D are displayed successively to bring about the effect of the agent executing something like a "warp" motion.

Figure 21A:
FIGS. 21A, 21B, 21C, and 21D are schematic views of the agent moving horizontally on the screen.
Figure 21B:
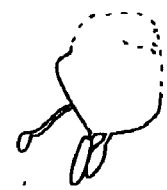
Figure 21C:
Figure 21D:

More specifically, at the start position of its warp motion, the agent 72 faces the direction in which it is about to warp, as shown in FIG. 21A. Upon executing a warp, the agent 72 disappears gradually from the head down as indicated in FIG. 21B. At the end position of its movement, the agent 72 appears gradually from its feet up. Eventually the agent 72 appears in its entirety as shown in FIG. 21D.

Figure 22A:
FIGS. 22A through 22G are schematic views of the agent moving vertically on the screen.
Figure 22B:

When the agent 72 is moved vertically on the desktop, the images shown in FIGS. 22A through 22G are displayed successively to form the apparent movement. More specifically, at the start position of its vertical motion, the agent 72 grips its own tail (the tip is shaped like a cord plug) by hand as shown in FIG. 22A. The agent 72 is then shown inserting the tip of its tail into something overhead as indicated in FIG. 22B.

Figure 22C:
Figure 22D:
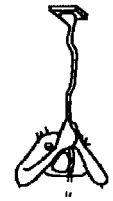
Figure 22E:
Figure 22F:
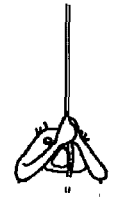
Figure 22G:

Thereafter the agent 72 inetamorphoses into a rope starting from its feet as shown in FIGS. 22C and 22D. In FIG. 22E, the agent 72 as a whole turns into a single rope that is moved toward the end position of the agent's move. At the end of the movement, the entire agent 72 is reconstituted successively from its head down as shown in FIGS. 22F and 22G.

Where the movement of the agent 72 is expressed in the so-called warp or as the metamorphosis into a rope, there is a distinctive benefit: fewer resources (e.g., memory locations) are needed to express the agent in motion.

Returning to FIG. 8 and in step S62, a check is made to see whether or not an event has occurred (i.e., input of a command for sending or receiving an e-mail or a command for editing an e-mail or related information). If no event is detected, step S63 is reached.

In step S63, a check is made to see whether or not a predetermined period of time has elapsed following transition of the agent 72 into the state of movement. Steps S62 and S63 are repeated until the predetermined time period is judged to have elapsed. When the predetermined time period is found to have elapsed in step S63, step S64 is reached.

Figure 23A:
FIGS. 23A and 23B are schematic views of the agent playing on the screen.
Figure 23B:
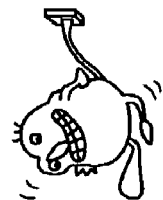

In step S64, display of the agent 72 is shifted from the moving state to a playing state expressed by the images in FIGS. 23A and 23B. FIG. 23A shows the agent 72 playing with a snake, and FIG. 23B shows the agent 72 plugging the tip of its tail into something overhead and swinging therefrom.

In step S65, a check is made to see whether or not an event has occurred. If no event is detected, step S66 is reached. In step S66, a check is made to see whether or not a predetermined period of time has elapsed following transition of the agent 72 into the playing state. Steps S65 and S66 are repeated until the predetermined time period is judged to have elapsed. When the fixed time period is found to have elapsed in step S66, step S67 is reached.

Figure 24:
FIG. 24 is a schematic view of the agent being asleep on the screen.

In step S67, display of the agent 72 is shifted from the playing state to a sleeping state expressed by the image in FIG. 24. In step S68, a check is made to see if an event has occurred. The check is repeated until an event is detected. When an event is detected in step S68, control is returned to step S35 in FIG. 7 and the subsequent steps are repeated.

When an event is detected in step S62 or in step S65, control is also returned to step S35 in FIG. 7 and the subsequent steps are repeated.

Although not shown in the flowchart of FIG. 8, the mailer 2 could be judged to be terminated while the standby process is still underway. In that case, control is returned to step S46.

Similarly, if the mailer 2 is judged terminated in step S33 of FIG. 7, then step S46 is reached.

Figure 25A:
FIGS. 25A and 25B are schematic views of the agent disappearing from the screen.
Figure 25B:

In step S46 of FIG. 7, the agent controlling part 13 shifts display of the agent 72 to a disappearing state expressed by the images in FIGS. 25A and 25B, for example. FIG. 25A shows the agent 72 walking away, waving and turning its back on the user. FIG. 25B shows the agent 72 getting smaller and eventually disappearing.

When the agent 72 has disappeared, the balloon 73, scrapbook window 74 and recommended URLs 91 are also erased from the desktop.

According to the invention, as described, heavily weighted words (i.e., keywords) are extracted from documents such as e-mails and processed so that information related to these words is recommended to the user in synchronism with the agent 72 in motion. The user is thus expected to experience confidence in and attachment to the agent 72 on display.

Figure 26:
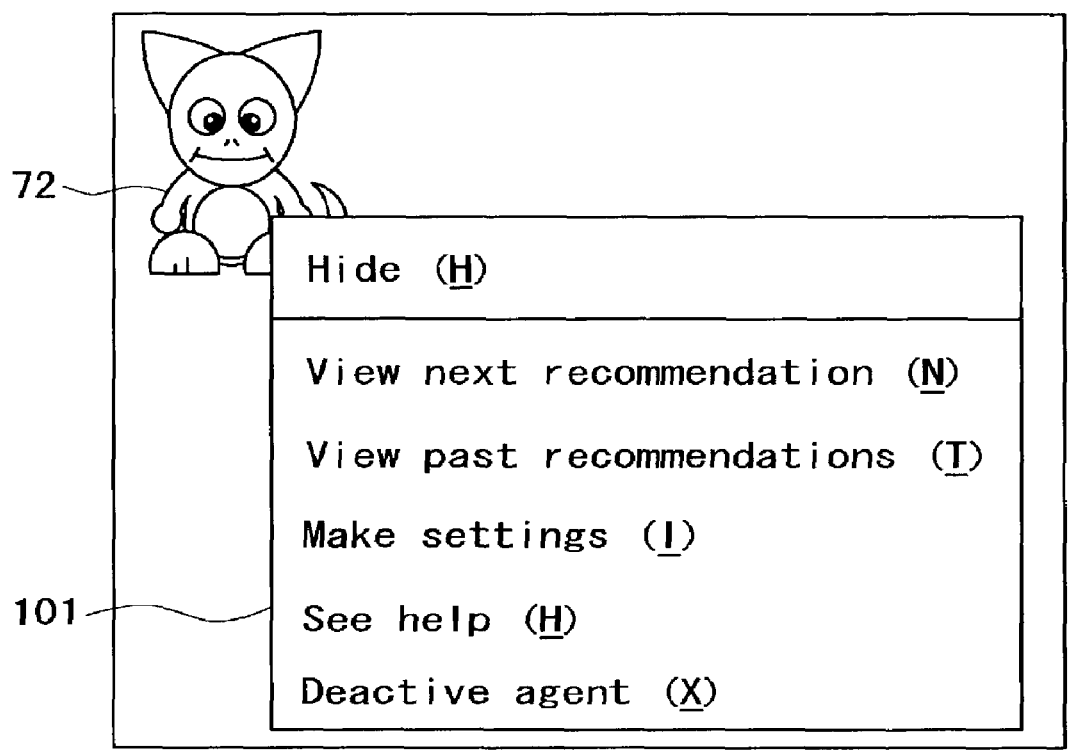
FIG. 26 is a schematic view of a menu box displayed on the screen.

The actions of the agent 72 and its speeches in the balloon 73 may be implemented and sound signals corresponding to the speeches output not only by the agent program 1 of this invention but also by diverse application programs constituting illustratively the help screens of games and word processor programs. The invention can also be applied to character images that appear on the displays of such devices as TV sets, camcorders and car navigation systems, and so forth.

Where a plurality of users operate the same personal computer, multiple agents 72 may be provided to have each user assigned his or her own agent 72 (see FIG. 26). The agent 72 may be created or edited as desired by the user. If the same user utilizes the agent program 1 on a plurality of personal computers, the same agent 72 may be arranged to appear on each of the different personal computers.

In the foregoing description, the agent 72 was shown appearing continuously during execution of the agent program 1. Alternatively, the agent 72 may be displayed only upon recommendation of related information or otherwise changed in its behavior as desired.

For example, with the agent program 1 in execution, the user may right-click the mouse to display a menu box 101 such as one shown in FIG. 26. From the menu box 101, the user may select the "Make settings" item to display a setting screen shown in FIG. 27.

Figure 27:
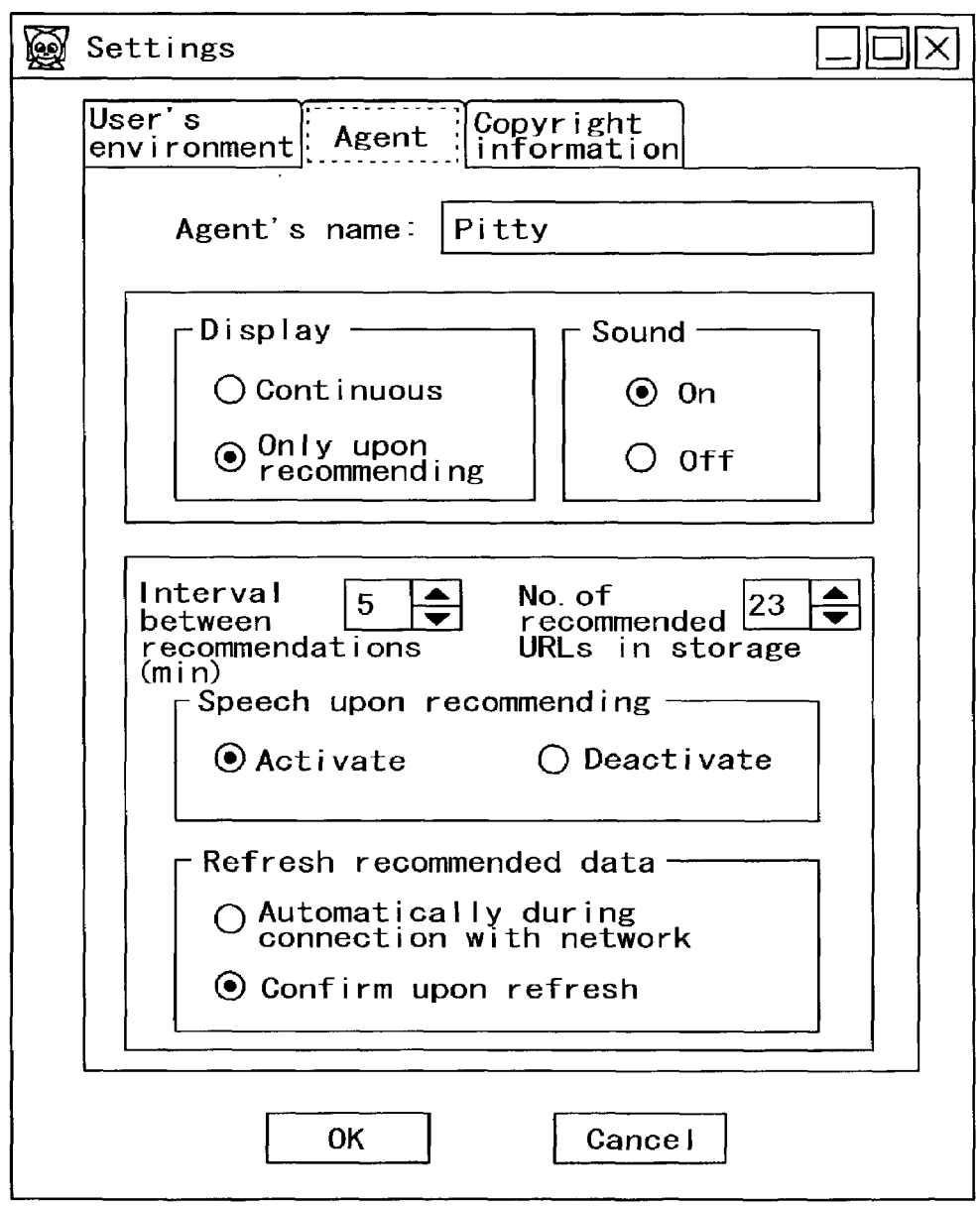
FIG. 27 is a schematic view of a setting screen.

The typical setting screen of FIG. 27 includes a plurality of tabs including one named "agent." Making the "agent" tab active displays items that may be selected or input by the user, such as the agent's name, display status, sound effects, recommending interval, number of recommendations in storage, activation/deactivation of audio speech output upon recommendation, and recommended data refresh status.

The user may input desired information (e.g., agent's name) or may select necessary items on the setting screen. Display status of the agent 72 and balloon 73, the interval for recommending related information, the number of preserved recommendations, and other settings are thus established as desired by the user.

When to update the database with the storing part 11 will now be described. The database is created by the database creating process discussed above with reference to the flowchart of FIG. 3. After its creation, the database needs to be updated in one of the following three cases:

First, the database needs to be updated when a predetermined period of time has elapsed following the creation or the most recent update of the database. The obvious reason for this is that the related information in the database may well have been outdated and largely irrelevant by then.

Second, the database needs to be updated when more than a predetermined portion of the related information therein has been presented to the user. That is when some of the related information starts getting presented repeatedly or relevant information for presentation is getting scarce. Third, the database needs to be updated when e-mails furnishing the documents from which to extract keywords have been exchanged so many times that the contents of the documents have been changed significantly.

In the event that the database needs to be updated (e.g., when a predetermined time period has elapsed on the timer 31A monitored by the event managing part 31), either the user may be prompted to issue an update command or the database may be automatically updated without the user's intervention. It is also possible for the user to update the database at any time desired.

A database updating process to be carried out in any of the three cases above requiring the update is described below with reference to the flowchart of FIG. 28. The database updating process, one of the processes executed by the agent program 1, is started concurrently with execution of the program 1 and repeated until the program 1 is terminated. It is assumed that prior to execution of this process, the database creating process of FIG. 3 has been carried out so that the database is already in place.

Figure 28:
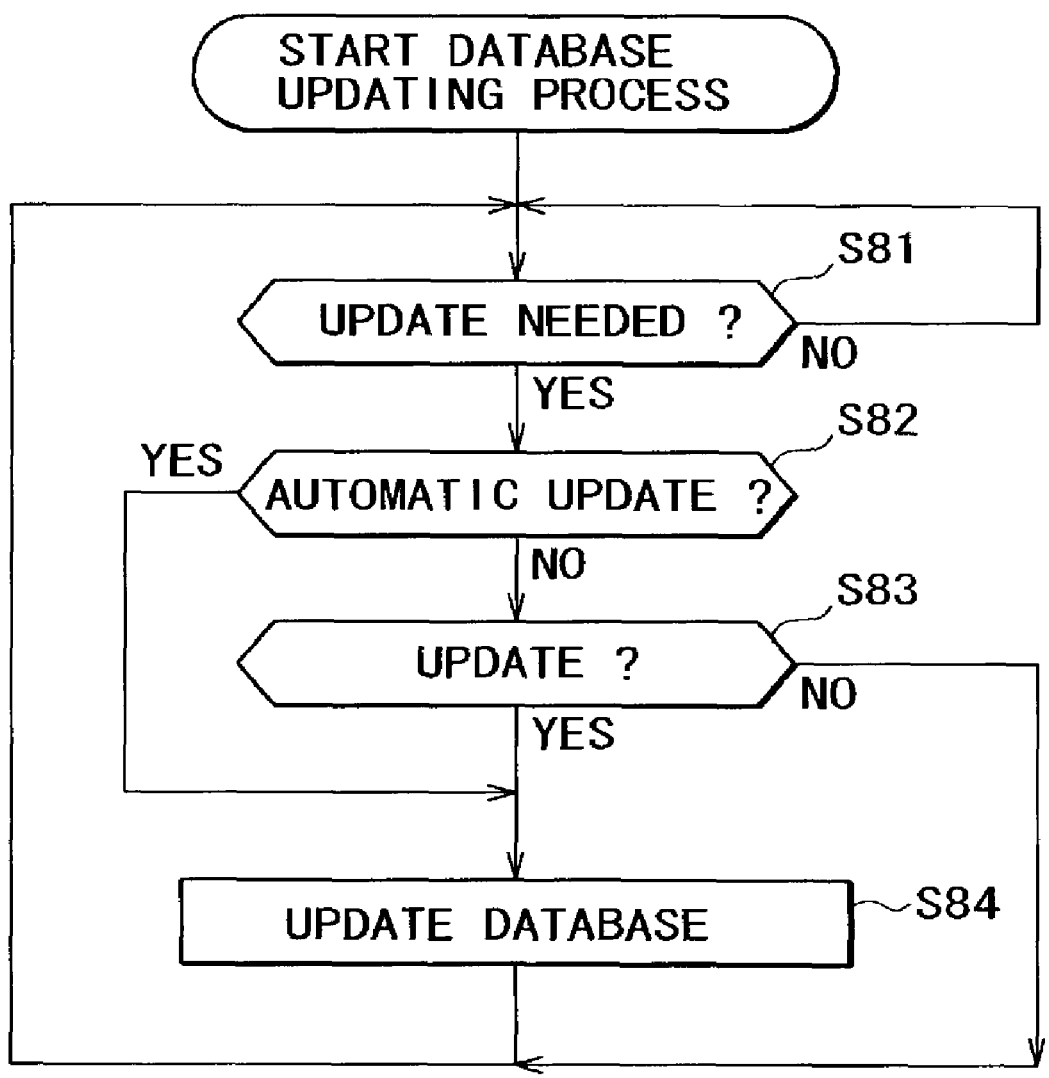
FIG. 28 is a flowchart of steps constituting a database updating process performed by the agent program.

In step S81 of FIG. 28, the storing part 11 of the agent program 1 judges whether or not the current database needs to be updated. The step is repeated until the database is judged to be in need of updating. The criterion for the judgment may be established in advance by the user on a user interface screen such as one shown in FIG. 29. The example of FIG. 29 presents four criteria represented by check boxes in the leftmost position on the screen. Any one of the check boxes may be checked by the user to make the corresponding criterion effective for the judgment. The first criterion is shown allowing the user to set the number of URLs that may be viewed before an update. The third criterion allows the user to set the update interval in terms of days.

If in step S81 the database is judged to be in need of updating, step S82 is reached. In step S82, the storing part 11 judges whether or not the database is set to be updated automatically. If the database is not judged to be set for automatic update, step S83 is reached. If in step S82 the database is judged to be set for automatic update, step S83 is skipped.

In step S83, the presenting part 12 of the agent program 1 notifies the user of the need for a database update and checks to see whether or not the user has given an update command in response to the notice. If the user is judged to have issued the update command in step S83, step S84 is reached. If no update command is judged to be issued by the user in step S83, control is returned to step S81 and the subsequent steps are repeated.

In step S84, the storing part 11 of the agent program 1 proceeds to update the database. More specifically, the document acquiring part 21, document attribute processing part 22 and document content processing part 23 in the storing part 11 all check the mailbox file that accommodates e-mails (i.e., this file is most often furnished with an extension "mbx") to obtain the most recent date of update. That date is compared with the previously acquired update date. If the comparison reveals that the mailbox file carries a more recent date than the preceding update and has a different file size from the preceding size, that means the file has been updated. In that case, any changes that have since been made to the file are extracted. The additions to or the modifications in the file when extracted are subjected to classification into mail groups, to mail header analysis, morphological analysis, and calculation of characteristic vectors. The keywords derived from these analyses are supplied to the related information searching part 25.

It might happen that the mail groups (topics) remain unchanged (i.e., no new mail has been added to any topic) and that the keywords remain the same before and after the update following the analyses. In that case, only the calculated values such as weights may be changed without a search for related information by the related information searching part 25. Before a search for related information is attempted on the Internet, a log-on check is carried out. If the check indicates that connection has yet to be established with the Internet, then the search for related information may be suppressed. In such a case, the user may be asked whether or not to search for related information at a subsequent connection to the network.

One of the above-mentioned criteria for the update judgment stipulates that in order to avoid presenting (i.e., recommending) related information repeatedly, the database should be updated after the related information for a given mail group has been recommended a predetermined number of times. The criterion is enforced illustratively by averting repeated recommendation of related information about the mail group (topic) found to have a high similarity to the acquired mail. The process is carried out typically as follows:

The mail groups are assigned their priorities for recommendation. For example, the maximum weight of the characteristic word within each mail group is regarded as representative of the priority value for that group, and the mail groups are queued in descending order of their recommendation priorities. Any mail group, for which related information is recommended once, is brought to the tail of the priority queue. This makes it possible to reduce the frequency with which any one of the mail groups within a given range of similarities is selected repeatedly for recommendation. Since what is changed is only the priority queue, it may be preferred to search for and acquire large quantities of related information beforehand so as to minimize the probability of repeated recommendation from the same mail group while ensuring a sufficient amount of information available.

In this context, the range of similarities may be varied depending on the amount of documents that fall under the topic used for extraction of characteristics. More specifically, several ranges of similarities may be established depending on the amount of documents or on the data size within a given topic for characteristic extraction. Illustratively, if the amount of documents that fall under a given topic is 10 files or less, the similarity may be set to 0.01 or higher; if the amount is 11 or more and less than 50, the similarity may be 0.03 or higher; if the amount of 50 files or more, the similarity may be 0.05 or higher. If the data size of documents within a given topic is less than 500 KB, the similarity may be set to 0.01 or higher; if the data size is 500 KB or greater, the similarity may be 0.02 or higher.

With a desired range of similarities determined in advance, related information is acquired for presentation following the search through topics in descending order of their priorities. This scheme prevents both shortages and an overflow of related information from the user's viewpoint. What is averted specifically is the situation where the range of similarities becomes too narrow to provide enough related information or too broad to furnish meaningful information to the user, as the amount of available documents diminishes and the database is updated in content.

As described, the database updating process deals only with the newly added or modified documents. This translates into a reduced processing time compared with conventional cases where the database creating process is repeatedly carried out.

During the database updating process, the calculated weights of words are modified to reflect the user's interest. Some examples of the weight modification are described below following an example, with reference to FIG. 30, of the characteristic vectors of topics stored in the database.

As shown in FIG. 30, the characteristic vector of a topic A (formed by the weights of words "a", "b", "c", "d", "e", "f" and "g") is (0, 0.54, 0.02, 0, 0, 0.01, 0); the characteristic vector of a topic B is (0.01, 0, 0.41, 0.33, 0.16, 0, 0.64); and the characteristic vector of a topic C is (0.51, 0.35, 0, 0, 0.48, 0.37, 0).

How to modify the weights of the words included in each topic (topics A, B and C) in FIG. 30 will now be described in three consecutive examples below.

Figures 31, 32:
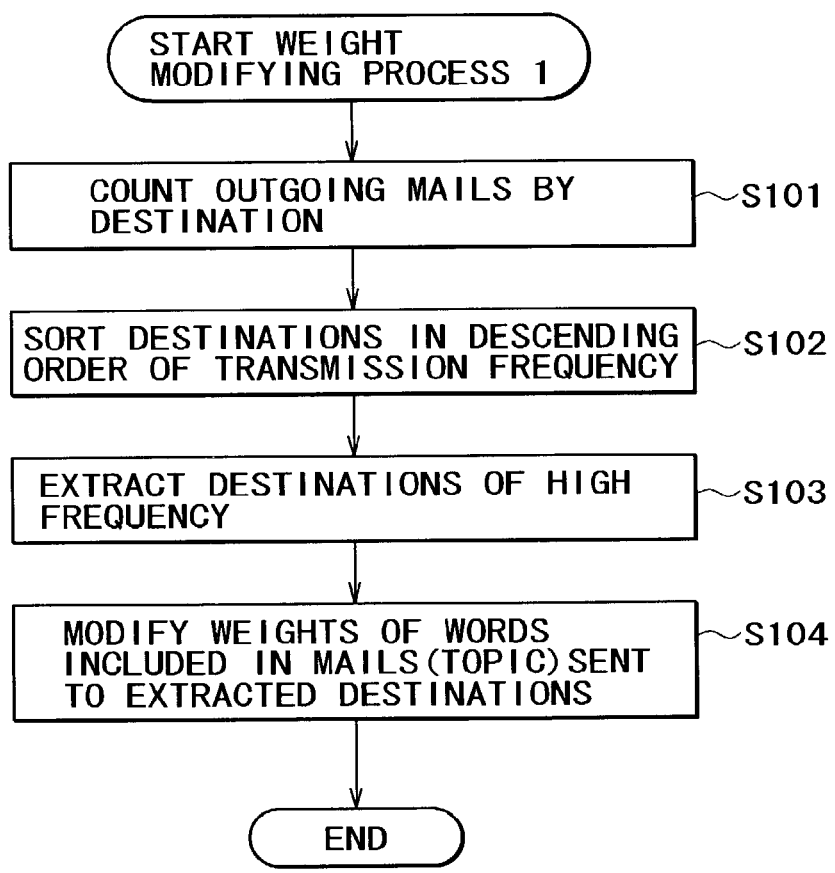
FIG. 31 is a flowchart of steps constituting a first example of a weight modifying process.
FIG. 32 is a tabular view listing mail destinations arranged in the descending order of mailing frequency.

The first example of the weight modifying process is described below by referring to the flowchart of FIG. 31. In step S101 of FIG. 31, the document characteristic database creating part 24 counts the number of times the mail (including the return mail) is sent to each of different e-mail destinations. In step S102, the destinations are sorted in the descending order of transmission frequency. The number of times the mail is received may optionally be added to the transmission count.

Suppose that the mail is exchanged with Messrs./Mses. A, B, C, and D and that the mail exchange count is 35 for Mr./Ms. A, 2 for Mr./Ms. B, 28 for Mr./Ms. C, and 4 for Mr./Ms. D. In that case, the mail destinations are sorted in descending order of their mail exchange counts, i.e., into Messrs./Mses. A, C, D and B, in that order.

In step S103, the document characteristic database creating part 24 extracts the destinations with high mail exchange frequencies following the sorting in step S102.

More specifically, the mail destinations are extracted according to any one of suitable methods. By one method, a predetermined number "n" (e.g., n=2) of destinations with the highest frequencies are selected; by another method, the destinations each having a mail exchange count of at least a predetermined number "m" (e.g., m=10) are selected; or the destinations are selected by the combination of these two methods (i.e., top "n" destinations with the highest frequencies, each having a mail exchange count of at least "m"). Extraction of the mail destinations can indeed be based on whatever method is deemed appropriate.

Illustratively, if the top two destinations with the highest mail exchange frequencies are to be selected, Messrs./Mses. A and C are extracted from the four parties listed in FIG. 32.

In step S104, the document characteristic database creating part 24 modifies the weight of each of the words included in the mails (topic) exchanged with the destinations extracted in step S103.

If the mails exchanged with Mr/Ms. A and Mr/Ms. C touch on the topic A, the words included in that topic are "b", "c" and "f" as indicated in FIG. 30. (Since the words "a", "d", "e" and "g" have zero weight each, these words are excluded from the topic A.) Then the words "b", "c" and "f" in the topic A have their weights modified.

Specifically, the weights of the words "b", "c" and "f" are each multiplied by a predetermined weight coefficient "k" (e.g., 1.2) for modification (i.e., for a relative increase). That is, the weight of the word "b" (=0.54), weight of the word "c" (=0.02) and weight of the word "f" (=0.01) are each multiplied by 1.2. The multiplication turns the characteristic vector of the topic A into (0, 0.65 (≈0.54×1.2), 0.02 (≈0.02× 1.2), 0, 0, 0.01 (≈0.01×1.2), 0) as shown in FIG. 33A.

In this manner, the weights of the words included in the topic attracting the user's particular attention are modified in accordance with the updates.

In another example, the words "b", "c" and "f" included in the topic A discussed with Messrs./Mses. A and C may also be found in a topic associated with destinations other than Messrs./Mses. A and C (e.g., Messrs./Mses. B and D). Here, too, the applicable words may be multiplied by the same weight coefficient "k" (1.2 in this case) for modification. Specifically, as shown in FIG. 30, the word "c" included in the topic B and the words "b" and "f" in the topic C have their weights multiplied by 1.2 each. The multiplication turns the characteristic vector of the topic B into (0.01, 0, 0.49 (≈0.41×1.2), 0.33, 0.16, 0, 0.64) and that of the topic C into (0.51, 0.42 (=0.35×1.2), 0, 0, 0.48, 0.44 (≈0.37× 1.2), 0), as indicated in FIG. 33B.

As described, where the words included in the topic discussed with some destinations of high mail exchange frequencies are also found in a topic associated with other destinations of lesser mail exchange frequencies, the weights of these words may also be modified. This makes it possible to select the keywords likely to attract the user's particular attention even from the topics discussed with the parties of lower mail exchange frequencies.

Furthermore, the weight coefficient "k" may be varied depending on the mail exchange frequency (order). More specifically, where the mails exchanged with Mr./Ms. A (of the highest exchange frequency) pertain to the topic B, the words "a", "c", "d", "e" and "g" included in that topic may have their weights multiplied by a different weight coefficient k1 (=1.5); where the mails exchanged with Mr./Ms. C (of the second-highest exchange frequency) cover the topic C, the words "a", "b", "e" and "f" found in this topic may have their weights multiplied by yet another weight coefficient k2 (=1.2). The multiplication turns the characteristic vector of the topic B into (0.02 (=0.01×1.5), 0, 0.62 (≈0.41× 1.5), 0.50 (≈0.33×1.5), 0.24 (=0.16×1.5), 0, 0.96 (=0.64× 1.5)) and that of the topic C into (0.61 (≈0.51×1.2), 0.42 (=0.35×1.2), 0, 0, 0.58 (≈0.48×1.2), 0.44 (≈0.37×1.2), 0), as indicated in FIG. 33C.

In the manner described above, the weights of the words included in the topic attracting the user's particular attention may be modified in accordance with the frequency with which mails are exchanged with each destination. The weight coefficient "k" may be either a value proportional to the mail exchange frequency in effect or any other value established as desired.

Figure 34:
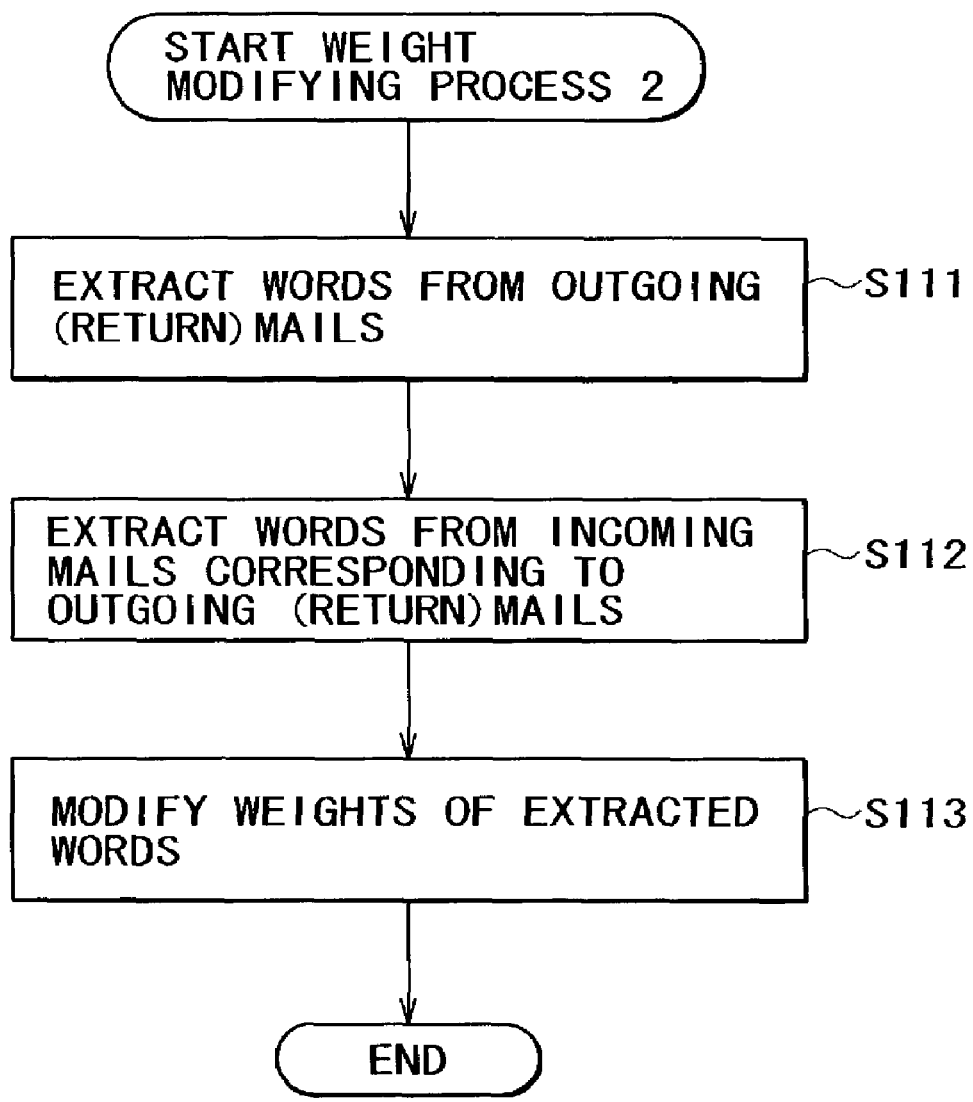
FIG. 34 is a flowchart of steps constituting a second example of the weight modifying process.

The second example of the weight modifying process is described below by referring to the flowchart of FIG. 34. In step S111, the document characteristic database creating part 24 identifies outgoing mails (including return mails) from among a plurality of mails grouped by topic, and extracts words from the outgoing mails. In step S112, the document characteristic database creating part 24 identifies the incoming mails received earlier corresponding to the return mails extracted in step S111, and extracts words from the received mails.

For example, words "b" and "c" are extracted from outgoing mails associated with a topic A; words "e" and "g" are extracted from outgoing mails returned in connection with a topic B; and a word "c" is extracted from an incoming mail received earlier which prompted the outgoing return mails.

In step S113, the document characteristic database creating part 24 modifies the weights of the words extracted in steps S111 and S112.

More specifically, the weight of each of the words included in the outgoing mails (including return mails) is multiplied by a predetermined weight coefficient k1 (e.g., 1.5) for modification. At the same time, the weight of each of the words found in the previously received incoming mail which prompted the return mails is multiplied by another weight coefficient k2 (e.g., 1.2) for modification. The multiplication turns the characteristic vector of the topic A into (0, 0.81 (≈0.54×1.5), 0.03 (≈0.02×1.5), 0, 0, 0.01, 0) and that of the topic B into (0.01, 0, 0.49 (≈0.41×1.2) 0.33, 0.24 (=0.16×1.5), 0, 0.96 (=0.64×1.5)) as shown in FIG. 35.

As described above, the words included in the mails sent out or returned by the user (i.e., the words utilized deliberately by the user) are extracted and modified in weight so that the words apparently attracting the user's particular attention are selected as keywords. Any words found only in the received mails are left untouched because they are not regarded as attracting the user's attention.

Alternatively, a different weight coefficient may be established for each of different mail types: one for outgoing mails, another for return mails, and another for received (incoming) mails. It might happen that the words included in outgoing mails (including return mails) and in received original mail which prompted the return mails in connection with a given topic may also be found in mails associated with another topic. In such a case, these words may also be modified accordingly.

Figure 36:
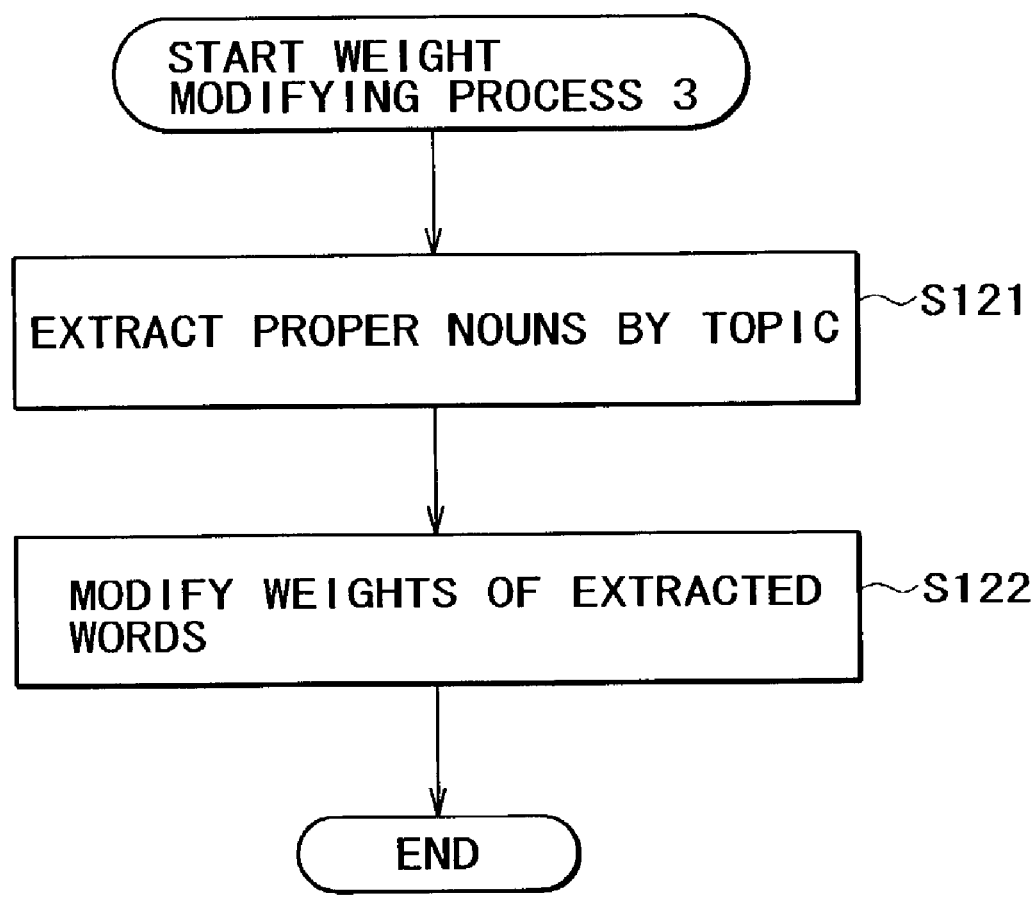
FIG. 36 is a flowchart of steps constituting a third example of the weight modifying process.

The third example of the weight modifying process is described below by referring to the flowchart of FIG. 36. In step S121, the document characteristic database creating part 24 extracts proper nouns indicative of specific regions or entities from among the words included in a given topic. Illustratively, words "b" and "f" are extracted as proper nouns.

In step S122, the document characteristic database creating part 24 modifies the weights of the words extracted in step S121.

Specifically, the weight of each of the words constituting the proper nouns included in each topic are multiplied by a predetermined weight coefficient "k" (e.g., 1.5) for modification. For example, the weight of the word "b" and that of the word "f" included in each of the topics shown in FIG. 30 are multiplied by 1.5. The multiplication turns the characteristic vector of the topic A into (0, 0.81 (≈0.54×1.5), 0.02, 0, 0, 0.02 (≈0.01×1.5), 0) and that of the topic C into (0.51, 0.53 (=0.35×1.5), 0, 0, 0.48, 0.56 (≈0.37×1.5), 0) as indicated in FIG. 37. (It should be noted that the words "b" and "f" are not included in the topic B.) In the manner described above, the weight of each of the words (proper nouns) attracting the user's particular attention is modified. A different weight coefficient "k" may be applied to each of different types of proper nouns (e.g., geographical names, organization names, product names, and persons' names). It is to be noted that persons' names, even if modified in weight, cannot be selected as keywords; all biographical names should be left unmodified.

In the foregoing description, the weights of extracted words were shown modified depending on the mail exchange frequency, send/receive status, part of speech (i.e., proper nouns). Obviously, these criteria may be suitably combined to form another basis for modifying the weights of the words. Any other method may be utilized for modifying the words in terms of weight as long as the user's interest is properly reflected.

In another example, there may be provided a category dictionary that classifies retained words in different categories. The document characteristic database creating part 24 may modify the weight of a given word included in the database depending on whether the word in question is included in the category dictionary.

Figure 38:
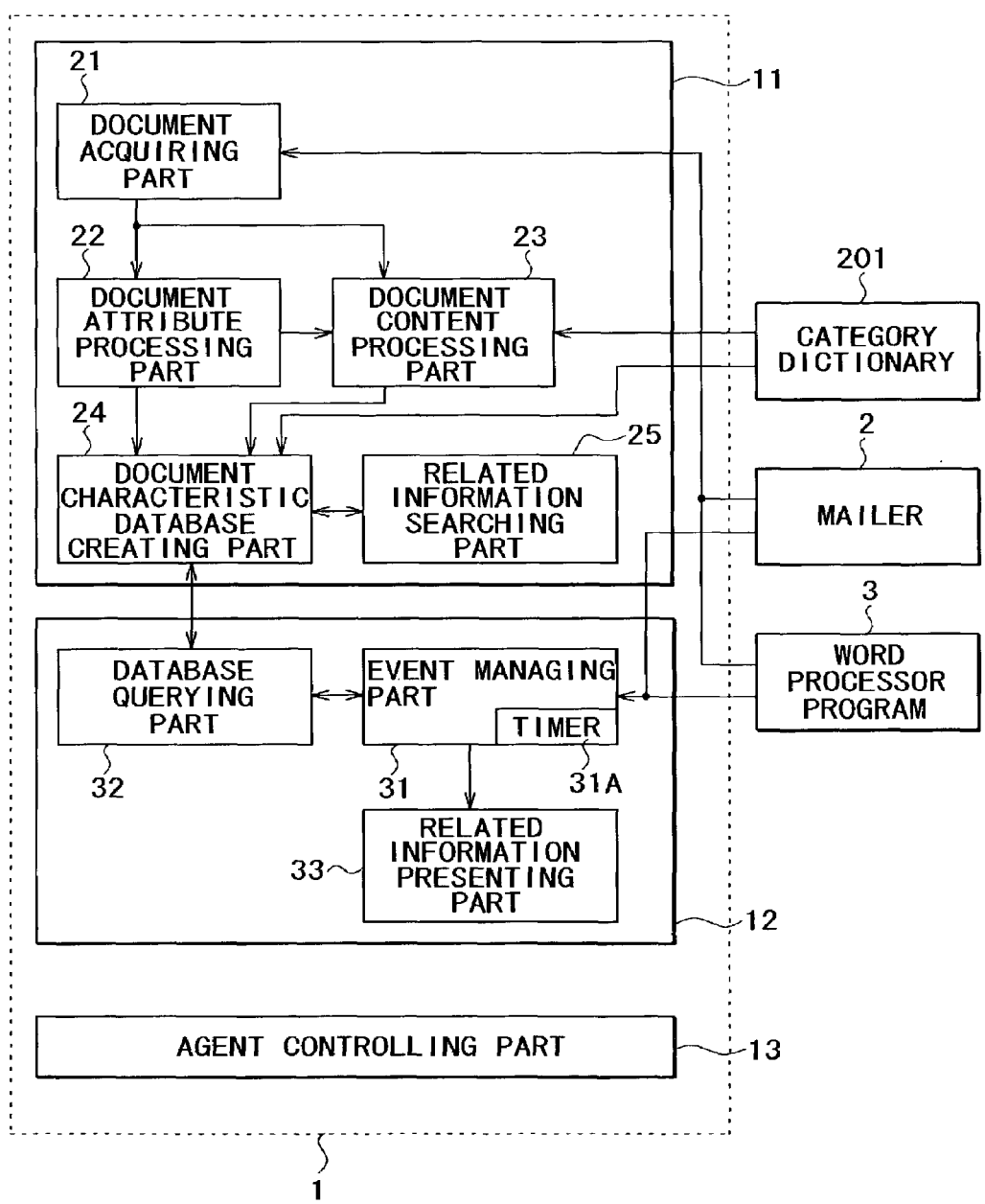
FIG. 38 is a schematic view showing another typical functional block structure of the agent program according to the invention.

FIG. 38 is a schematic view showing another typical functional block structure of the agent program according to the invention. In FIG. 38, a category dictionary 201 serves as a database that retains words classified into categories such as humanities, fine arts, and diverse fields of science. In practice, the category dictionary 201 may have a plurality of categories centering on that attracts the user's particular attention, each category including corresponding words.

The document characteristic database creating part 24 references the category dictionary 201 to see whether a given word included in the created database is registered in the dictionary 201. If the word in question is judged registered in the category dictionary 201, that word is modified in weight.

Specifically, if a word found in the database is judged included in the category dictionary 201 (i.e., if the word falls into a category attracting the user's interest), the document characteristic database creating part 24 modifies the weight of that word. The process serves to reflect the user's interest in the weights of the words contained in the database.

Figure 39:
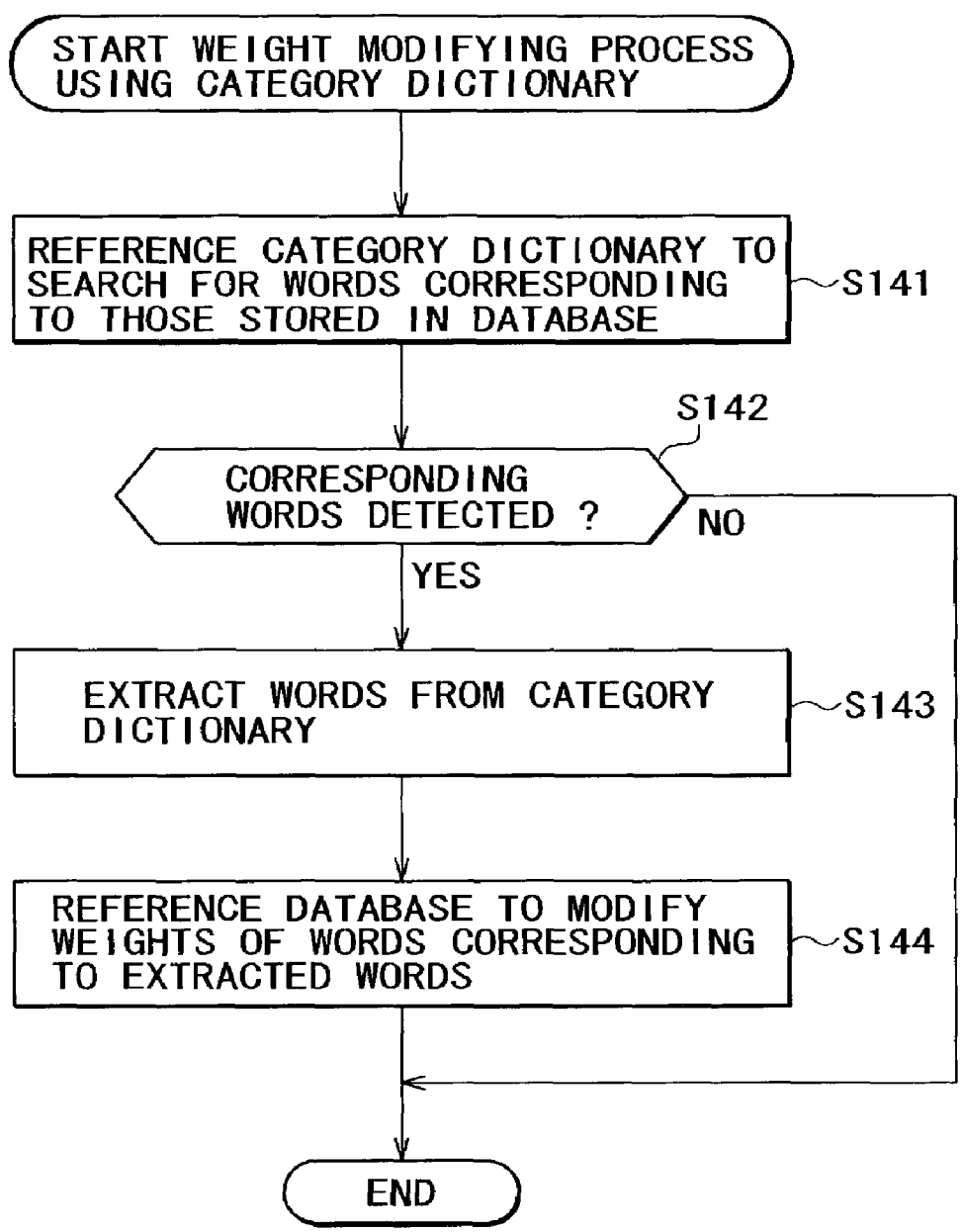
FIG. 39 is a flowchart of steps constituting a weight modifying process using a category dictionary created by a document characteristic database creating part included in FIG. 2.

Described below with reference to the flowchart of FIG. 39 is how the document characteristic database creating part 24 carries out a weight modifying process using the category dictionary. In step S141 of FIG. 39, the document characteristic database creating part 24 first references the category dictionary 201 to search for words corresponding to those registered in the database. More specifically, the part 24 searches the category dictionary 201 for words that are the same as those under the same category in the database.

In step S142, the document characteristic database creating part 24 judges whether any corresponding words exist based on the result of the reference. If the corresponding words are judged to exist, step S143 is reached.

In step S143, the document characteristic database creating part 24 extracts the applicable words from the category dictionary 201. In step S144, the document characteristic database creating part 24 references the database to modify the weight of each of the extracted words. This terminates the weight modifying process that utilizes the category dictionary 201.

If in step S142 any words corresponding to those in the database are not judged to exist based on the result of the reference, then the document characteristic database creating part 24 skips steps S143 and S144 and terminates this weight modifying process using the category dictionary 201.

Illustratively, suppose that the characteristic vector of a given topic (weights of words A, B, C, D, E, F and G) is (1.1, 0.1, 0, 0, 1.4, 5.1, and 3.8) and that two words are to be selected as the most important words by the database querying part 32. In that case, the words F and G are selected.

Suppose now that the category dictionary 201 includes words A, B, D, H, K, and L and that the document characteristic database creating part 24 has multiplied each of the corresponding words in the database by five for modification. In such a case, the characteristic vector above is modified into (5.5, 0.5, 0, 0, 1.4, 5.1, and 3.8). Thus the database querying part 32 selects the words A and F as the most important words.

In the foregoing description, those words in the database, which correspond to the words in the category dictionary 201, were shown modified in weight using the same coefficient. However, this is not limitative of the invention. Alternatively, the weight modifying coefficient may be varied for each of the words included in the category dictionary 201. That is how the document characteristic database creating part 24 performs the weight modifying process using the category dictionary 201.

In the foregoing description, the document characteristic database creating part 24 was shown by modifying the weights of those words in the database, which correspond to the words in the category dictionary 201. Alternatively, those words in the database, which correspond to the words in the category dictionary 201, may be designated as the most important words.

Figure 40:
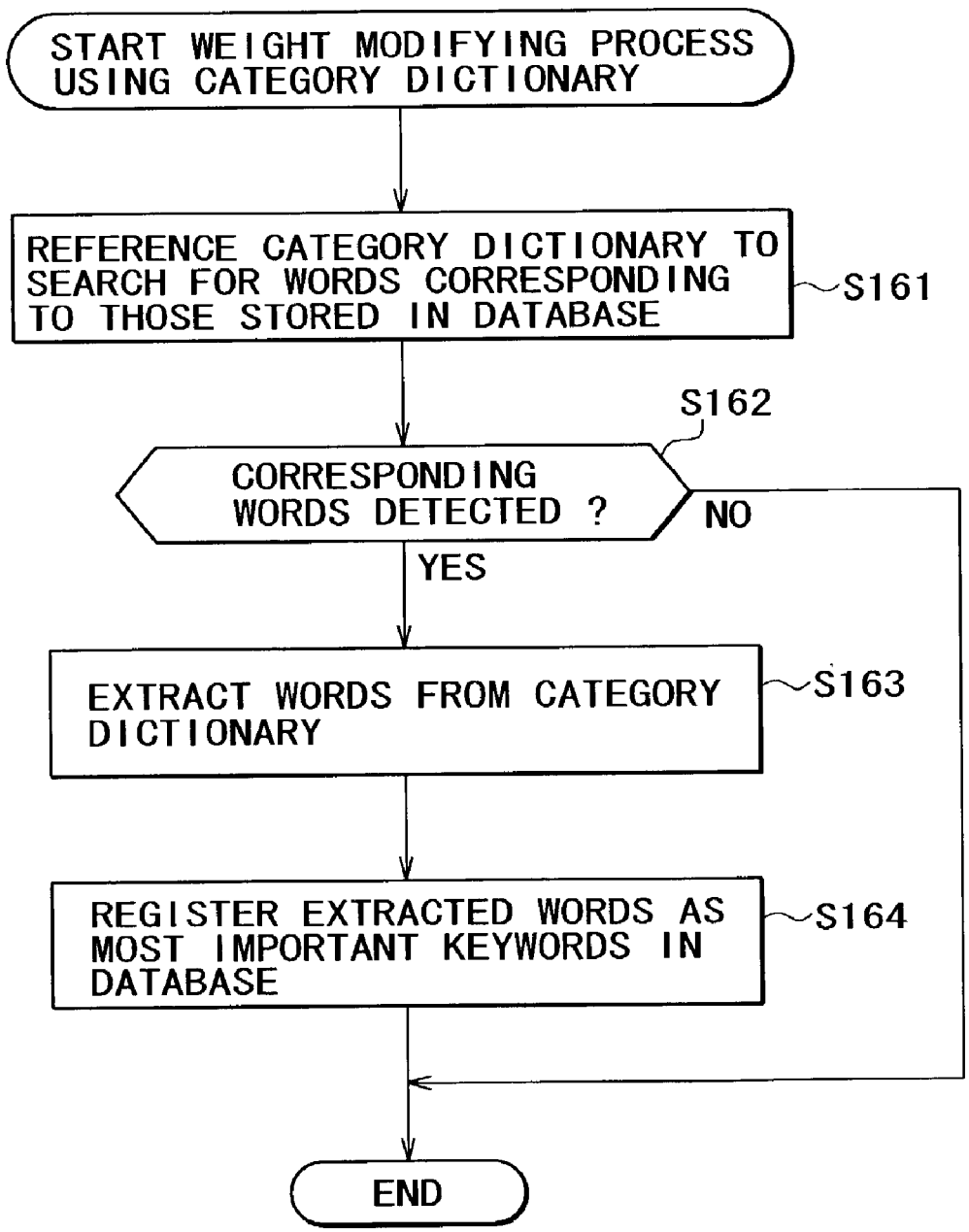
FIG. 40 is a flowchart of steps constituting another weight modifying process using the category dictionary created by the document characteristic database creating part in FIG. 2.

Described below with reference to the flowchart of FIG. 40 is another example in which the document characteristic database creating part 24 carries out the weight modifying process using the category dictionary.

In step S161 of FIG. 40, the document characteristic database creating part 24 first references the category dictionary 201 to search for words corresponding to those registered in the database. Specifically, the part 24 searches the category dictionary 201 for words that are the same as those under the same category in the database.

In step S162, the document characteristic database creating part 24 judges whether any corresponding words exist based on the result of the reference. If the corresponding words are judged to exist, step S163 is reached.

In step S163, the document characteristic database creating part 24 extracts the applicable words from the category dictionary 201. In step S164, the document characteristic database creating part 24 registers the extracted words as the most important words in the database. The part 24 then terminates the weight modifying process that utilizes the category dictionary 201.

If in step S162 any words corresponding to those in the database are not judged to exist based on the result of the reference, then the document characteristic database creating part 24 skips steps S163 and S164 and terminates this weight modifying process using the category dictionary 201.

Illustratively, suppose that the characteristic vector of a given topic (weights of words A, B, C, D, E, F, and G) is (1.1, 0.1, 0, 0, 1.4, 5.1, and 3.8) and that two words are to be selected as the most important words by the database querying part 32. In that case, the words F and G are selected as the most important words.

Suppose also that the category dictionary 201 includes words A, B, D, H, K, and L and that the document characteristic database creating part 24 has registered these words as the most important words in the database. In such a case, the characteristic vector above remains the same (i.e., 1.1, 0.1, 0, 0, 1.4, 5.1, 3.8) but the database querying part 32 selects the words A and B as the most important words. Although the word D is also included in the category dictionary 201, the word is not selected because it has zero weight.

As described, the document characteristic database creating part 24 designates as the most important words those words in the database, which correspond to the words in the category dictionary 201. The database querying part 32 further selects some of the designated words as the most important words.

Although the category dictionary 201 was shown containing six words above, this is not limitative of the invention. The category dictionary 201 may contain any number of words and may be structured in any manner desired.

How to create the category dictionary 201 such as the one discussed above will now be described. Illustratively, the category dictionary 201 may be composed of commercially available thesauruses or ontology dictionaries having a hierarchical or group structure each.

Such dictionaries are typically stored beforehand on the same storage medium that carries the principal application program of the invention. When the storage medium is loaded into the drive 51, the CPU 41 retrieves the dictionaries therefrom and installs what is retrieved into the storage unit 49. The CPU 41 references the installed dictionaries when creating a category dictionary.

Specifically, the CPU 41 extracts words from part or all of the installed dictionaries. In creating a target category dictionary 201 using the extracted words, the CPU 41 reflects in the target the structure (hierarchical, group, etc.) of the reference dictionaries that constitute the basis for the dictionary being created.

On updating the category dictionary 201, the CPU 41 performs the same steps as those for creating it. That is, with the necessary storage medium loaded into the drive 51, the CPU 41 retrieves new reference dictionaries from the medium for installation and refers to the newly installed dictionaries in order to update the category dictionary 201.

The dictionaries to be referenced may alternatively be acquired over a network such as the Internet using email or a similar feature. Once the necessary dictionaries are obtained, the CPU 41 proceeds the same way as above to create the category dictionary 201. New versions of such reference dictionaries may be acquired at predetermined intervals or as designated by the user over the network to keep the category dictionary 201 up to date.

The dictionaries to be referenced may be something other than the above-mentioned thesauruses or ontology dictionaries, such as a list of frequently extracted words. The category dictionary 201 may also be created directly based on the user's input.

The category dictionary 201 above may alternatively be created from sources other than conventionally available dictionaries. Illustratively, Web pages of online shopping sites, bulletin board sites, category-specific search sites, or other websites on the Internet may be used to create the category dictionary 201.

The CPU 41 acquires such Web pages over the Internet when connected thereto through the communication unit 50. With the pages of suitable websites obtained, the CPU 41 proceeds to create the category dictionary 201. Illustratively, the CPU 41 extracts words such as product names from the pages and turns the extracted words into a category dictionary 201 while reflecting the Web page structure (hierarchical, group, etc.) in what is being built.

In such cases, the CPU 41 may acquire updated pages of the relevant websites at predetermined intervals or as designated by the user over the network to keep the category dictionary 201 up to date.

In another example, in step S6 of FIG. 3, the related information searching part 25 may access a search engine for a search over the Internet using as search conditions the keywords for search (important words) furnished by the document characteristic database creating part 24. In such a case, an external server (not shown) acquires the keywords and gathers information based on these keywords. The information thus provided may then be used as a basis for creating the category dictionary 201.

Specifically, the externally established server (not shown) acquires and retains the keywords used by the related information searching part 25. The server ranks the retained keywords in terms of use frequency to prepare a list of suitably ranked words.

The CPU 41 obtains the word list in a properly timed manner, and creates the category dictionary 201 based on that list.

More specifically, as shown in FIG. 41, the server creates user-specific word lists (for Mr./Ms. X, Y, . . . ) based on the acquired keywords. The words are grouped by the frequency with which each word has been used.

In the example of FIG. 41, the server generates not only the dictionary of simply listed words in descending order of their search frequencies but also a list of grouped keywords (in Gp1 and Gp2) based on the combinations of keywords for search selected from each of the topics in effect (TopicX01 through TopicX04, TopicY01 through TopicY03).

In another example, users employing similar keywords for search may be brought together to form a user group in which scalar products of the vectors sharing such keywords fall within a certain range when calculated. Then the keywords utilized only by the users within a given group may be extracted for a particular search.

As another alternative, the CPU 41 may acquire information about the operations for accessing and saving related information, store the acquired information in the storage unit 49, and supply the operation information to the server in appropriately timed fashion. Based on the supplied operation information, the server may generate a preferred list of keywords that are highly appreciated by the user (i.e., the corresponding related information is attracting the user's attention).

When the category dictionary 201 created in any of the manners described above is to be updated, the CPU 41 first gains access to the server in a suitably timed manner to obtain the list. The CPU 41 then updates the information in the category dictionary 201 based on the acquired list.

As described, the category dictionary 201 may be created on the basis of diverse kinds of information.

The category dictionary 201 may alternatively be composed of dictionaries covering a plurality of categories, each of the dictionaries being created in any of the manners discussed above. In such cases, the category dictionary to be referenced by the document characteristic database creating part 24 may be prepared in one of several ways: (1) the user may selectively download beforehand those of the multiple dictionaries in the category dictionary 201, which attract the user's attention; (2) of the component dictionaries making up the category dictionary 201, the one that contains more words about all topics than any other component dictionaries may be selected by the category dictionary 201 in advance; (3) where a dictionary of a given category is to be used according to keywords, the category dictionary 201 may select from its multiple component dictionaries the one that includes the largest number of relevant keywords registered; or (4) where an external server provides category dictionaries, the server may bring users into groups in accordance with the contract provisions, use history, or other criteria and may select the dictionary to be offered to each user group for the services preferred thereby.

In the foregoing description, those words in the database judged to be included in the category dictionary 201 were shown weighted more during word weight calculation performed by the document characteristic database creating part 24. Alternatively, the words contained in the category dictionary 201 may be given further weight when the document content processing part 23 calculates the weights of words.

Illustratively, suppose that it is possible to modify a morphological analysis dictionary used in the morphological analysis performed by the document content processing part 23 in step S3 of FIG. 3. In that case, a new part of speech (e.g., words of general interest) is added beforehand to the morphological analysis dictionary so that the new part of speech will correspond to some of the words in the category dictionary 201. When the document content processing part 23 weights each word by the tf.idf method in step S4 of FIG. 3, the words belonging to the new part of speech are given more weight. In this manner, the weights of the words included in the category dictionary 201 are increased when the document content processing part 23 carries out word weight calculation.

It is also possible to make arrangements so that the newly added part of speech (i.e., words of general interest) in the category dictionary is given preference over the existing parts of speech when the words are weighted. In that case, even if a given word included in the category dictionary 201 falls in one of the existing parts of speech, that word is judged to belong to the newly added part of speech and thus is given higher weight.

As described, using the category dictionary 201 allows the words in the database to be modified in weight in a manner facilitating the presentation of related information about a given field attracting the user's interest.

In the foregoing description, the category dictionary 201 was shown used for increasing the weights of words in the database with a view to facilitating the presentation of related information about the field attracting the user's interest. Alternatively, the category dictionary 201 may be utilized to lower the weights of words in the database.

Illustratively, the words in a particular field deemed inappropriate from an educational point of view may be lowered in weight for the group of underage users only. Likewise, specific words may be reduced in weight for certain groups of users. As another alternative, the category dictionary 201 may be referenced so that specific words are multiplied by zero so as to be given zero weight each.

Described so far are some examples showing how the words included in a given topic are modified in weight. Alternatively, the words included in documents prepared by the word processor program 3 may also be modified in weight in like manner. In such cases, the weights of words may be modified not per topic but by the folder or document containing them.

If the database were conventionally created using only the words extracted simply from the user's e-mail exchanges, the topics attracting the user's attention would be treated the same way as those not retaining the user's particular interest. That drawback is corrected by carrying out the word weight modifying processes explained above with reference to the flowcharts of FIGS. 31, 34, and 36. The modifying processes correct the weights of the words attracting the user's particular attention, thereby creating a meaningful database. Thus in step S15 of FIG. 5 showing the related information presenting process, the database thus created facilitates selection of the words deemed to attract the user's specific attention as important words. When those components of characteristic vectors in documents or topics relating to a specific field are highlighted as relevant to the user's interest in that category, it is possible to extract the topics that better reflect the user's interest. This in turn makes it possible to present related information that better reflects the user's interest.

Conversely, when the vector components pertaining to fields not attracting the user's attention are lowered in weight, the important words not useful from the user's viewpoint are eliminated. That suppresses extraction of topics based on the components of insignificant characteristic vectors, whereby presentation of related information not desired by the user is prevented.

In step S39 of FIG. 7 in conjunction with step S16 of FIG. 5, the agent controlling part 13 was shown displaying on the desktop the document attribute information as the reason for the selection (i.e., recommendation). In such a case, only part of the attribute information may be displayed, i.e., out of a plurality of display patterns that may be generated from the same attribute information.

FIGS. 42A through 42E are schematic views showing how a plurality of display patterns are generated on the basis of the same attribute information. For example, as shown in FIG. 42A, attribute information such as "Aug. 21, 2001," "Mr./Ms. A", and "party" is generated and displayed on the desktop along with the reason for the selection (recommendation) "wines and cakes." Alternatively, as indicated in FIG. 42B, the agent controlling part 13 may use all of these words when generating the reason for the selection (recommendation) in sentences like, "On Aug. 21, 2001, you talked to Mr./Ms. A about the party, didn't you? I have some information about the wines and cakes you brought up during the talk." These sentences are displayed in the balloon 73 of the agent 72. As other alternatives, part of the words used above may be employed to create different sentences as the reasons for the selection (recommendation), and the created sentences are displayed likewise in the balloon 73 of the agent 72.

More specifically, in step S39 of FIG. 7 in conjunction with step S16 of FIG. 5, the agent controlling part 13 generates one of such expressions as, "On Aug. 21, 2001, you sent an e-mail to Mr./Ms. A, didn't you? I have some information about what you talked about." shown in FIG. 42C; "You talked to Mr./Ms. A about the party, didn't you? I have some information about that." in FIG. 42D; and "You talked to Mr./Ms. A about wines and cakes, didn't you? I have some related information." in FIG. 42E. One of these expressions is displayed in the balloon 73 of the agent 72 after being generated.

In the manner described, the agent controlling part 13 generates and displays different expressions even when using the same document repeatedly as the reason for the selection (recommendation). The feature helps minimize the decline of the user's interest in what is being talked about.

As a variation of the examples above, the combinations of words used once may be stored in the storage unit 49. Whenever the agent controlling part 13 generates an expression of the reason for selection (recommendation), the part 13 may reference the stored combinations so as to avoid using the same combinations of words.

As another alternative, when generating expressions of the reason for recommendation, the agent controlling part 13 may search for synonyms, words of a superordinate concept or related words through a thesaurus or an ontology dictionary (neither shown) and may use the retrieved words as representative of the recommending reason. For example, based on "Aug. 21, 2001 " shown in FIG. 42A, such expressions as "toward the end of August" or "toward the end of the summer" may be adopted as the words constituting the reason for the recommendation; given "the party" in FIG. 42A, words like "celebration" may be picked up to represent the recommending reason; or on the basis of "wines and cakes" in FIG. 42A, such words as "foreign liquors and foreign cakes" may be employed to indicate the reason for the recommendation.

The agent program 1 of this invention is designed to address not only the documents exchanged by the mailer 2 or the documents edited by the word processor program 3 as described above, but also any documents having timestamps as their attribute information, such as texts of chats, electronic news, and electronic bulletin boards as well as texts derived from voice signals.

The agent program 1 executing the above-described series of processes is either incorporated beforehand in the personal computer or installed upon use from a suitable storage medium into the PC.

The series of steps described above may be executed by hardware but is usually carried out by software. For such software-based processing to take place, the agent program 1 constituting the software may be either incorporated beforehand in dedicated hardware of a computer or installed upon use from a suitable storage medium into a general-purpose personal computer or like equipment capable of executing diverse functions based on the various programs installed.

As shown in FIG. 2, the storage medium carrying programs to be installed into the computer for execution may be a package medium constituted by the magnetic disc (including flexible discs) 52, optical disc (including CD-ROM [Compact Disc-Read Only Memory] and DVD [Digital Versatile Disc]) 53, magneto-optical disc (including MD (Mini-Disc), a registered trademark) 54, or semiconductor memory 55; or may come in the form of the ROM 42 or hard discs constituting the storage unit 49. The storage medium has the programs recorded thereto as needed through wired or wireless communication means such as public switched networks, local area networks, the Internet, and digital satellite broadcasting networks, by way of communication interfaces such as routers and modems.

In this specification, the steps that are stored on the storage medium and that describe the programs to be executed represent not only the processes that are carried out in the depicted sequence (i.e., on a time series basis) but also processes that are conducted parallelly or individually.

Where the information processing apparatus, information processing method, and program according to the invention are in use, a first characteristic word is extracted from existing document information and a second characteristic word is extracted from specific document information. A first weight of the first characteristic word and a second weight of the second characteristic word are both calculated. The first weight is then modified based on a specific condition. Related information corresponding to the existing document information is acquired on the basis of the first characteristic word and the first weight. The existing document information related to the specific document information is searched for and retrieved based on the second characteristic word. The related information corresponding to the retrieved existing document information is then displayed. The inventive scheme thus makes it possible to present the user with related information reflecting the user's particular interest.

While a preferred embodiment of the invention has been described using specific terms, such description if for illustrative purposes only, and it is to be understood that changes and variations may be made without departing from the spirit or scope of the following claims.

What is claimed is:

1. An information processing apparatus for presenting related information about existing document information and about specific document information, the information processing apparatus comprising:

a processor for processing the existing document information;

a memory for storing the existing document information;

extracting means for extracting a first characteristic word from the existing document information and a second characteristic word from the specific document information;

attribute information extracting means for extracting attribute information from the existing document information and the specific document information;

classifying means for classifying the existing document information into one or more groups based on the attribute information;

weight calculating means for calculating, for each group, a first weight of the first characteristic word and a second weight of the second characteristic word following the extraction by the extracting means;

weight modifying means for modifying, for each group, the calculated first weight based on the extracted attribute information and based on frequency of either transmissions to a destination or receptions from the destination, wherein the calculated first weight of the first characteristic word in a group associated with a first frequency of transmission is increased if the same or similar words appear in another group having a second frequency of transmission, the first frequency of transmission being lower than the second frequency of transmission;

acquiring means for acquiring the related information corresponding to the existing document information based on the first characteristic word and based on the first weight modified by the weight modifying means;

searching means for searching for the existing document information related to the specific document information, based on the second characteristic word; and display controlling means for controlling display of the related information corresponding to the existing document information searched for by the searching means.

2. The information processing apparatus according to claim 1, wherein the acquiring means selects, from a plurality of the first characteristic words in the existing document information, keywords based on the first weight in order to acquire the related information about the keywords.

3. The information processing apparatus according to claim 1, wherein the searching means calculates a similarity based on the first and the second weights in order to search for the existing document information corresponding to the specific document information based on the similarity.

4. The information processing apparatus according to claim 1, wherein the weight modifying means modifies weights according to the number of occurrences of the attribute information.

5. The information processing apparatus according to claim 1, further comprising wherein the extracting means extracts the first characteristic word from the groups;

the weight calculating means calculates the first weight of the first characteristic word;

the acquiring means acquires the related information corresponding to the groups based on the first characteristic word and the first weight; and the searching means is adapted to search within any of the groups which correspond to the specific document information, based on the second characteristic word.

6. The information processing apparatus according to claim 1, wherein
the weight modifying means modifies the first weight of the first characteristic word created by a user of the information processing apparatus.

7. The information processing apparatus according to claim 1, wherein
the weight modifying means modifies, in the same manner as the first weight is modified, the weight of the first characteristic word extracted from the existing document information.

8. The information processing apparatus according to claim 1, wherein
the weight modifying means modifies the first weight based on a type of the first characteristic word.

9. The information processing apparatus according to claim 1, further comprising
database creating means for creating a database using the related information acquired by the acquiring means in relation to the first characteristic word;
wherein the searching means searches the database for the existing document information related to the specific document information, based on the second characteristic word.

10. The information processing apparatus according to claim 1, further comprising
detecting means for detecting a specific event;
wherein the specific document information corresponds to the detection of the specific event.

11. The information processing apparatus according to claim 1, wherein
the existing document information and the specific document information comprise emails.

12. The information processing apparatus according to claim 1, further comprising
category dictionary creating means for creating a category dictionary, which is made up of groups of words in a specific data structure and which denotes relations between words within the group of words;
wherein the weight modifying means modifies the first weight calculated by the weight calculating means, based on the category dictionary.

13. The information processing apparatus according to claim 12, wherein
the category dictionary constitutes a database comprising word groups recorded in categories to which the words belong.

14. The information processing apparatus according to claim 12, wherein
the category dictionary constitutes a database comprising the word groups recorded In a hierarchical structure based on the relations between the words.

15. The Information processing apparatus according to claim 12, wherein
the category dictionary constitutes a database comprising the word groups arranged in a list based on a degree of importance assigned to each of the words.

16. The information processing apparatus according to claim 12, wherein
the category dictionary comprises the word groups and a data structure formed by the word groups that are derived from an existing dictionary database.

17. The information processing apparatus according to claim 12, wherein
the category dictionary comprises the word groups and a data structure formed by the word groups that are derived from Web page data.

18. The information processing apparatus according to claim 12, wherein
the category dictionary comprises the word groups and a data structure formed by the word groups that are derived from a list of the second characteristic words used earlier by the searching means.

19. The information processing apparatus according to claim 12, wherein
the weight modifying means modifies the first weight of the first characteristic word corresponding to some words in the category dictionary.

20. An information processing method for use with an information processing apparatus for presenting related information about existing document information and about specific document information, the information processing method comprising the steps of:
extracting a first characteristic word from the existing document information and a second characteristic word from the specific document information;
extracting attribute information from the existing document information and the specific document information;
classifying the existing document information into one or more groups based on the attribute information;
calculating, for each group, a first weight of the first characteristic word and a second weight of the second characteristic word following the extraction in the extracting step;
modifying, for each group, the calculated first weight based on the extracted attribute information and based on frequency of either transmission to a destination or receptions from the destination, wherein the calculated first weight of the first characteristic word in a group associated with a first frequency of transmission is increased if the same or similar words appear in another group having a second frequency of transmission, the first frequency of transmission being lower than the second frequency of transmission;
controlling acquisition of the related information corresponding to the existing document information based on the first characteristic word and based on the first weight modified in the weight modifying step;
searching for the existing document information related to the specific document information, based on the second characteristic word; and
displaying related information corresponding to the existing document information searched for in the searching step.

21. The information processing method according to claim 20, wherein
the acquisition controlling step comprises selecting, from a plurality of the first characteristic words, keywords based on the first weight in order to acquire the related information about the keywords.

22. The information processing method according to claim 20, wherein
the searching step comprises calculating a similarity based on the first and the second weights in order to search for the existing document information corresponding to the specific document information.

23. An information processing method according to claim 20, wherein the modifying step modifies weights according to the number of occurrences of the attribute information.

24. The information processing method according to claim 20, wherein the weight modifying step comprises modifying the first weight based on a type of the first characteristic word.

25. The information processing method according to claim 20, further comprising
creating a database using the related information that is acquired in the acquisition controlling step in relation to the first characteristic word.

26. The information processing method according to claim 20, further comprising the step of
creating a category dictionary which is made up of groups of words in a specific data structure and which denotes relations between the words,
wherein the weight modifying step comprises modifying the first weight calculated in the weight calculating step, based on the category dictionary.

27. The information processing method according to claim 26, wherein
the category dictionary constitutes a database comprising the word groups recorded in categories to which the words belong.

28. The information processing method according to claim 26, wherein
the category dictionary constitutes a database comprising the word groups recorded in a hierarchical structure based on the relations between the words.

29. The information processing method according to claim 26, wherein
the category dictionary constitutes a database comprising the word groups arranged in a list based on a degree of importance assigned to each of the words.

30. The information processing method according to claim 26, wherein
the category dictionary comprises the word groups and a data structure formed by the word groups that are derived from an existing dictionary database.

31. The information processing method according to claim 26, wherein
the category dictionary comprises the word groups and a data structure formed by the word groups that are derived from Web page data.

32. The information processing method according to claim 26, wherein
the category dictionary comprises the word groups and a data structure formed by the word groups that are derived from a list of the second characteristic words used earlier in the searching step.

33. The information processing method according to claim 26, wherein
the weight modifying step comprises modifying the first weight of the first characteristic word corresponding to some of the words in the category dictionary.

34. A storage medium that stores a computer-readable program for controlling an information processing apparatus for presenting related information about existing document information and about specific document information, the program comprising the steps of:
extracting a first characteristic word from the existing document information and a second characteristic word from the specific document information;
extracting attribute information from the existing document information and the specific document information;
classifying the existing document information into one or more groups based on the attribute information;
calculating, for each group, a first weight of the first characteristic word and a second weight of the second characteristic word following the extraction in the extracting step;
modifying, for each group, the calculated first weight based on the extracted attribute information and based on frequency of either transmissions to a destination or receptions from the destination, wherein the calculated first weight of the first characteristic word in a group associated with a first frequency of transmission is increased if the same or similar words appear in another group having a second frequency of transmission, the first frequency of transmission being lower than the second frequency of transmission;
controlling acquisition of the related information corresponding to the existing document information based on the first characteristic word and based on the first weight modified in the weight modifying step;
searching for the existing document information related to the specific document information, based on the second characteristic word; and
controlling display of the related information corresponding to the existing document information searched for in the searching step.

35. The storage medium according to claim 34, wherein the acquisition controlling step comprises selecting, from a plurality of the first characteristic words in the existing document information, keywords based on the first weight in order to acquire the related information about the keywords.

36. The storage medium according to claim 34, wherein the searching step comprises calculating a similarity based on the first and the second weights in order to search for the existing document information corresponding to the specific document information based on the similarity.

37. The storage medium according to claim 34, wherein the modifying step modifies weights according to the number of occurrences of the attribute information.

38. The storage medium according to claim 34, wherein the weight modifying step comprises modifying the first weight based on a type of the first characteristic word.

39. The storage medium according to claim 34, further comprising the step of
creating a database using the related information that is acquired in the acquisition controlling step in relation to the first characteristic word.

40. The storage medium according to claim 34, further comprising the step of
creating a category dictionary which is made up of groups of words in a specific data structure and which denotes relations between words of the group of words,
wherein the weight modifying step comprises modifying the first weight calculated in the weight calculating step, based on the category dictionary.

41. The storage medium according to claim 40, wherein the category dictionary constitutes a database comprising the word groups recorded in categories to which the words belong.

42. The storage medium according to claim 40, wherein the category dictionary constitutes a database comprising the word groups recorded in a hierarchical structure based on the relations between the words.

43. The storage medium according to claim 40, wherein the category dictionary constitutes a database comprising the word groups arranged in a list based on a degree of importance assigned to each of the words.

44. The storage medium according to claim 40, wherein the category dictionary comprises the word groups and a data structure formed by the word groups that are derived from an existing dictionary database.

45. The storage medium according to claim 40, wherein the category dictionary comprises the word groups and a data structure formed by the word groups that are derived from Web page data.

46. The storage medium according to claim 40, wherein the category dictionary comprises the word groups and a data structure formed by the word groups that are derived from a list of the second characteristic words used earlier in the searching step.

47. The storage medium according to claim 40, wherein the weight modifying step comprises modifying the first weight of the first characteristic word corresponding to some words in the category dictionary.

48. A storage medium that stores a computer-readable program for controlling an information processing apparatus for presenting related information about existing document information and about specific document information, the program causing a computer to execute the steps of:
- extracting a first characteristic word from the existing document information and a second characteristic word from the specific document information;
- extracting attribute information from the existing document information and the specific document information;
- classifying the existing document information into one or more groups;
- calculating, for each group, a first weight of the first characteristic word and a second weight of the second characteristic word following the extraction in the extracting step;
- modifying, for each group, the calculated first weight based on the extracted attribute information and based on frequency of either transmissions to a destination or receptions from the destination, wherein the calculated first weight of the first characteristic word in a topic associated with a frequency of transmission is increased if the same or similar words appear in another group having a second frequency of transmission, the first frequency of transmission being lower than the second frequency of transmission;
- controlling acquisition of the related information corresponding to the existing document information based on the first characteristic word and based on the first weight modified in the weight modifying step;
- searching for the existing document information related to the specific document information, based on the second characteristic word;
- controlling display, using an animated desktop agent, of the related information corresponding to the existing document information searched for in the searching step.

49. The storage medium according to claim 48, wherein the acquisition controlling step comprises selecting, from a plurality of the first characteristic words, keywords based on the first weight in order to acquire the related information about the keywords.

50. The storage medium according to claim 48, wherein the searching step comprises calculating a similarity based on the first and the second weights in order to search for the existing document information corresponding to the specific document information.

51. The storage medium according to claim 48, wherein the modifying step modifies weights according to the number of occurrences of the attribute information.

52. The storage medium according to claim 48, wherein the weight modifying step comprises modifying the first weight based on a type of the first characteristic word.

53. The storage medium according to claim 48, further comprising the step of
creating a database using the related information that is acquired in the acquisition controlling step in relation to the first characteristic word.

54. The storage medium according to claim 48, further comprising the step of
creating a category dictionary which is made up of groups of words in a specific data structure and which denotes relations between words of the group of words,
wherein the weight modifying step comprises modifying the first weight calculated in the weight calculating step, based on the category dictionary.

55. The storage medium according to claim 54, wherein the category dictionary constitutes a database comprising the word groups recorded in categories to which the words belong.

56. The storage medium according to claim 54, wherein the category dictionary constitutes a database comprising the word groups recorded in a hierarchical structure based on the relations between the words.

57. The storage medium according to claim 54, wherein the category dictionary constitutes a database comprising the word groups arranged in a list based on a degree of importance assigned to each of the words.

58. The storage medium according to claim 54, wherein the category dictionary comprises the word groups and a data structure formed by the word groups that are derived from an existing dictionary database.

59. The storage medium according to claim 54, wherein the category dictionary comprises the word groups and a data structure formed by the word groups that are derived from Web page data.

60. The storage medium according to claim 54, wherein the category dictionary comprises the word groups and a data structure formed by the word groups that are derived from a list of the second characteristic words used earlier in the searching step.

61. The storage medium according to claim 54, wherein the weight modifying step comprises modifying the first weight of first characteristic word corresponding to some words in the category dictionary.

* * * * *